(12) United States Patent
Hanada

(10) Patent No.: US 10,705,698 B2
(45) Date of Patent: Jul. 7, 2020

(54) EXECUTING FUNCTIONS ASSOCIATED WITH ICONS HAVING OVERLAPPING AREAS

(71) Applicant: KYOCERA Document Solutions Inc., Osaka (JP)

(72) Inventor: Naoto Hanada, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 260 days.

(21) Appl. No.: 15/761,560

(22) PCT Filed: Sep. 28, 2016

(86) PCT No.: PCT/JP2016/078708
§ 371 (c)(1),
(2) Date: Mar. 20, 2018

(87) PCT Pub. No.: WO2017/057507
PCT Pub. Date: Apr. 6, 2017

(65) Prior Publication Data
US 2018/0260104 A1 Sep. 13, 2018

(30) Foreign Application Priority Data

Sep. 30, 2015 (JP) .................................. 2015-194380
Sep. 30, 2015 (JP) .................................. 2015-194381
(Continued)

(51) Int. Cl.
*G06F 3/0484* (2013.01)
*G06F 3/0481* (2013.01)
(Continued)

(52) U.S. Cl.
CPC ........ *G06F 3/04845* (2013.01); *G06F 3/0481* (2013.01); *G06F 3/0482* (2013.01);
(Continued)

(58) Field of Classification Search
CPC ............... G06F 3/04845; G06F 3/0481; G06F 3/04817; G06F 3/0482; G06F 3/0488;
(Continued)

(56) References Cited

U.S. PATENT DOCUMENTS

2003/0090495 A1* 5/2003 Tomita .................. G06F 1/1626
345/619
2007/0050810 A1* 3/2007 Imaizumi ........... H04N 5/44591
725/37
(Continued)

FOREIGN PATENT DOCUMENTS

JP         2009-294850 A     12/2009

*Primary Examiner* — Mandrita Brahmachari
(74) *Attorney, Agent, or Firm* — IP Business Solutions, LLC

(57) ABSTRACT

A display device includes a display unit, a display control unit, a reception unit, and a processing unit. The display control unit generates a synthesized icon when allocated areas of at least two of a plurality of icons displayed in the display unit overlap. The processing unit executes, when the reception unit receives a slide operation starting from a point in a region of the synthesized icon where the icons overlap, a function associated with the icon displayed at an end point of the slide operation, out of the functions respectively associated with the icons superposed in the region.

11 Claims, 25 Drawing Sheets

(30) Foreign Application Priority Data

Sep. 30, 2015 (JP) ................................ 2015-194382
Sep. 30, 2015 (JP) ................................ 2015-194383

(51) Int. Cl.
*G06F 3/0488* (2013.01)
*G06F 3/0482* (2013.01)

(52) U.S. Cl.
CPC ........ *G06F 3/0488* (2013.01); *G06F 3/04817* (2013.01); *G06F 3/04883* (2013.01); *G06F 2203/04804* (2013.01); *G06F 2203/04808* (2013.01)

(58) Field of Classification Search
CPC ....... G06F 3/04883; G06F 2203/04804; G06F 2203/04808
See application file for complete search history.

(56) References Cited

U.S. PATENT DOCUMENTS

| | | | | |
|---|---|---|---|---|
| 2008/0165390 A1* | 7/2008 | Kim | ..................... | H04N 1/3871 358/451 |
| 2009/0144642 A1* | 6/2009 | Crystal | ............... | G06F 3/04817 715/764 |
| 2009/0303373 A1 | 12/2009 | Yamada | | |
| 2011/0035691 A1* | 2/2011 | Kim | ..................... | G06F 3/04817 715/765 |
| 2013/0305187 A1* | 11/2013 | Phillips | ............... | G06F 3/04842 715/800 |
| 2017/0192621 A1* | 7/2017 | Leem | ................... | H04N 9/8205 |

* cited by examiner

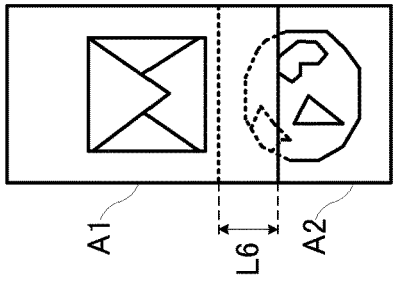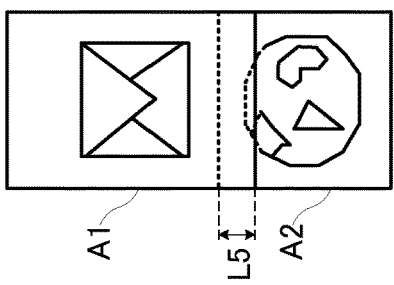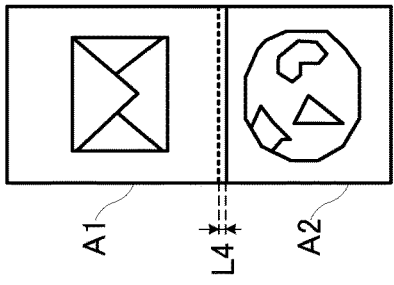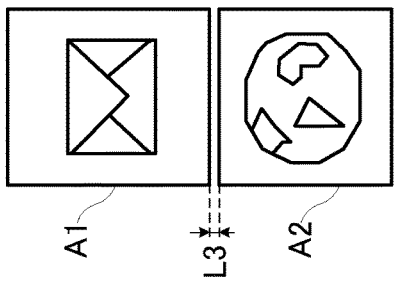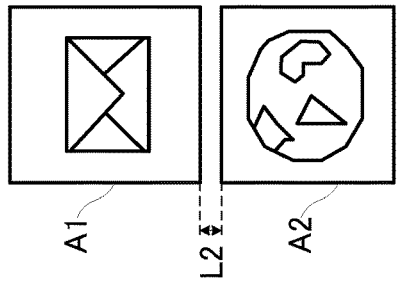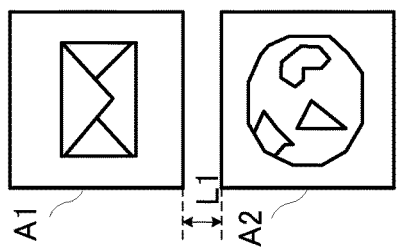

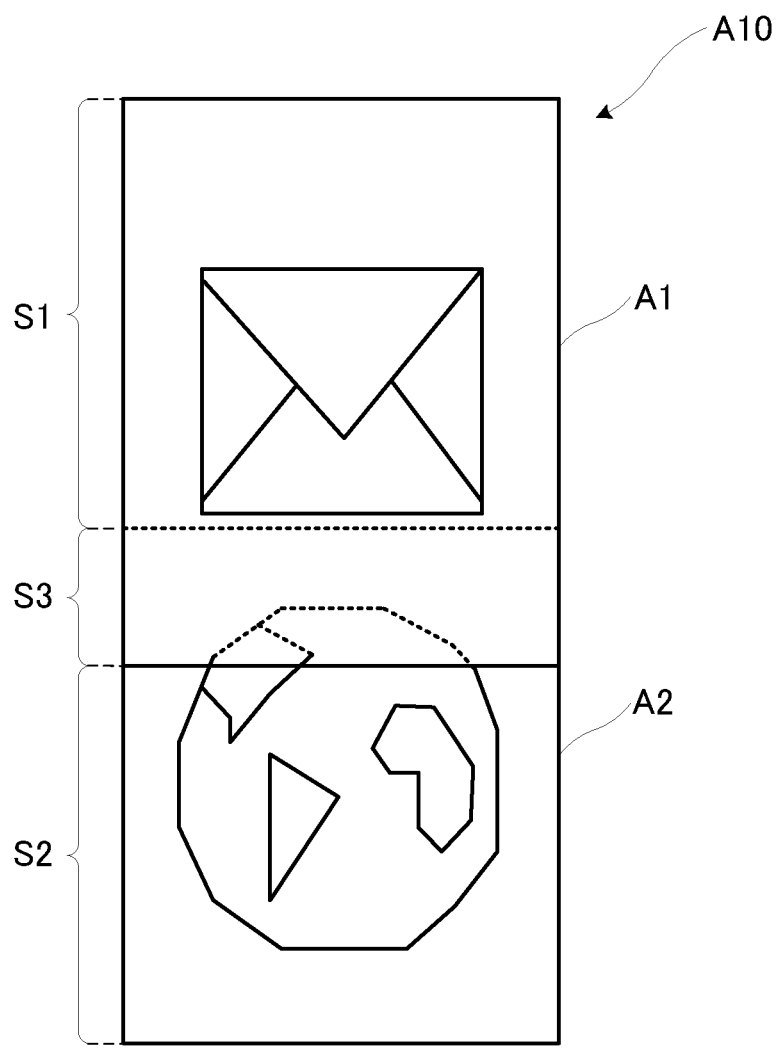

EXECUTING FUNCTIONS ASSOCIATED WITH ICONS HAVING OVERLAPPING AREAS

TECHNICAL FIELD

The present invention relates to a display device, and more particularly to a technique to display an operation screen on which a plurality of icons are arranged.

BACKGROUND ART

Display devices such as a smartphone or the like are configured to display an operation screen, in which generally square icons, associated with various functions, are arranged. A user can cause the display device to perform a desired function, by selecting the desired icon on the operation screen, as disclosed, for example, in Patent Literature (PTL) 1 cited below.

CITATION LIST

Patent Literature

[PTL 1] Japanese Unexamined Patent Application Publication No. 2009-294850

SUMMARY OF INVENTION

Technical Problem

The user can change the allocated area of the icon on the operation screen, for example by performing a drag operation of the icon. In the existing display devices, however, the allocated area of the icon can only be changed within a range where the allocated area does not overlap that of another icon. In other words, the existing display devices are not designed so as to handle the case where the allocated areas of the respective icons overlap.

The present invention has been accomplished in view of the foregoing situation, and provides a technique to enable, when the allocated areas of the respective icons overlap, execution of an operation with respect to the icon.

Solution to Problem

In an aspect, the present invention provides a display device including a display unit that displays an operation screen in which a plurality of icons, each associated with a predetermined function and representing an image indicating the function associated with the icon, are arranged, a display control unit that controls a displaying operation of the display unit, a reception unit that receives an operation inputted through the operation screen, and a processing unit that executes the operation received by the reception unit. The display control unit is configured to (i) enlarge the icon when the reception unit receives the predetermined operation with respect to the icon, (ii) generate, when respective allocated areas of at least two icons overlap owing to the enlarging of the icon, a synthesized icon including a first region where the allocated areas are not overlapping and a second region where the allocated areas are overlapping, and representing, in the second region, a synthesized image generated according to a plurality of images represented by the at least two icons, and (iii) cause the display unit to display the synthesized icon generated. The processing unit is configured to (i) execute the function associated with the icon shown in the first region, when the reception unit receives an operation of selecting a point in the first region of the synthesized icon, and (ii) execute, when the reception unit receives a slide operation starting from a point in the second region of the synthesized icon, the function associated with the icon displayed at an end point of the slide operation, out of the functions respectively associated with the at least two icons.

Advantageous Effects of Invention

The mentioned configuration enables, when the allocated areas of the respective icons overlap, execution of an operation with respect to the icon.

BRIEF DESCRIPTION OF DRAWINGS

FIG. 6A is a view showing a clearance between the icons in an initial allocated area, and FIG. 6B to FIG. 6F are views each showing how the clearance is corrected when the clearance between the icons is changed, as result of enlarging the icon by the pinch-out operation.

FIG. 7 is a view showing an example of a synthesized icon.

DESCRIPTION OF EMBODIMENTS

Hereafter, a display device according to an embodiment of the present invention will be described, with reference to the drawings.

Embodiment 1

Figure 1:
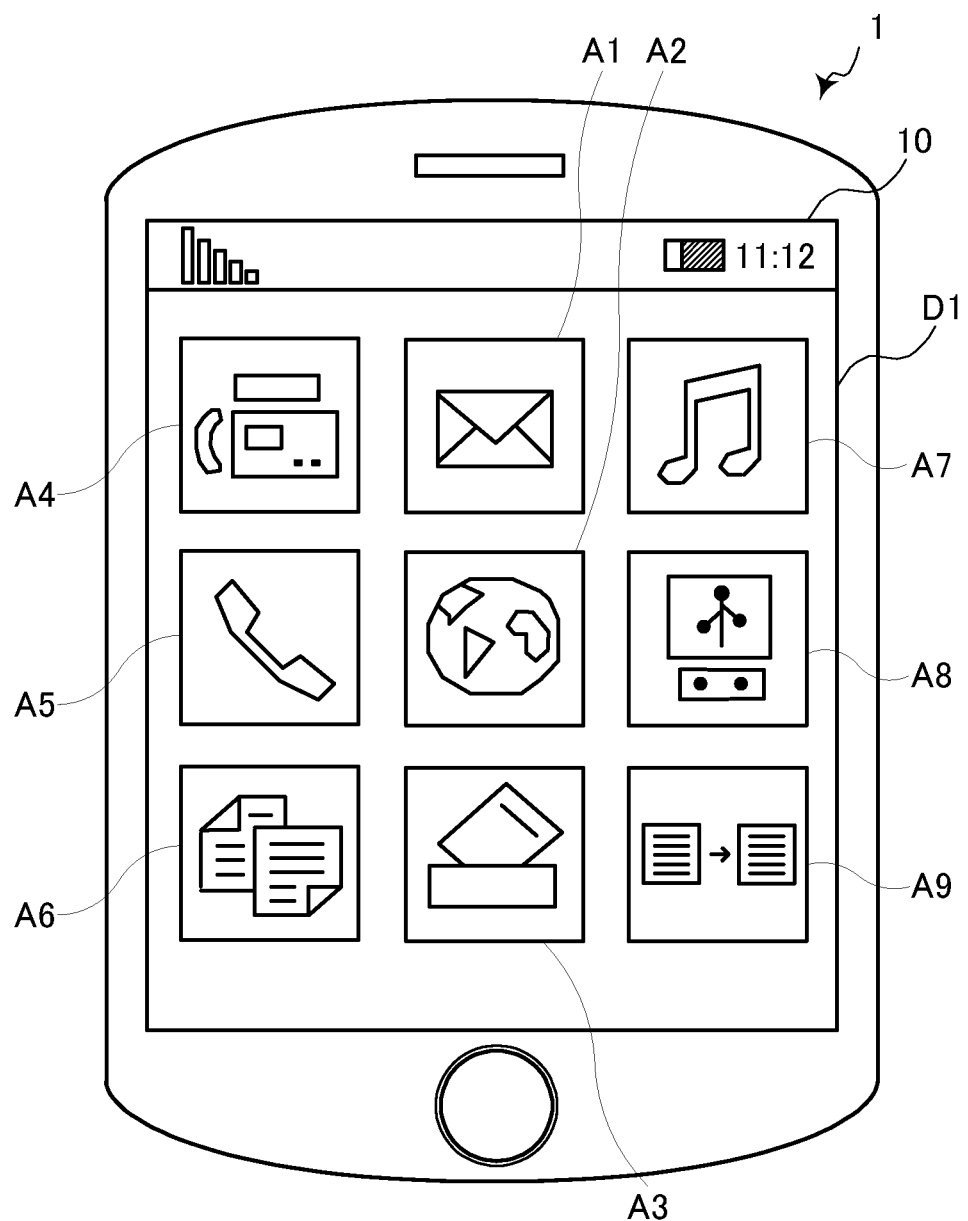
FIG. 1 is a plane view showing an appearance of a display device according to an embodiment 1.
Figure 2:
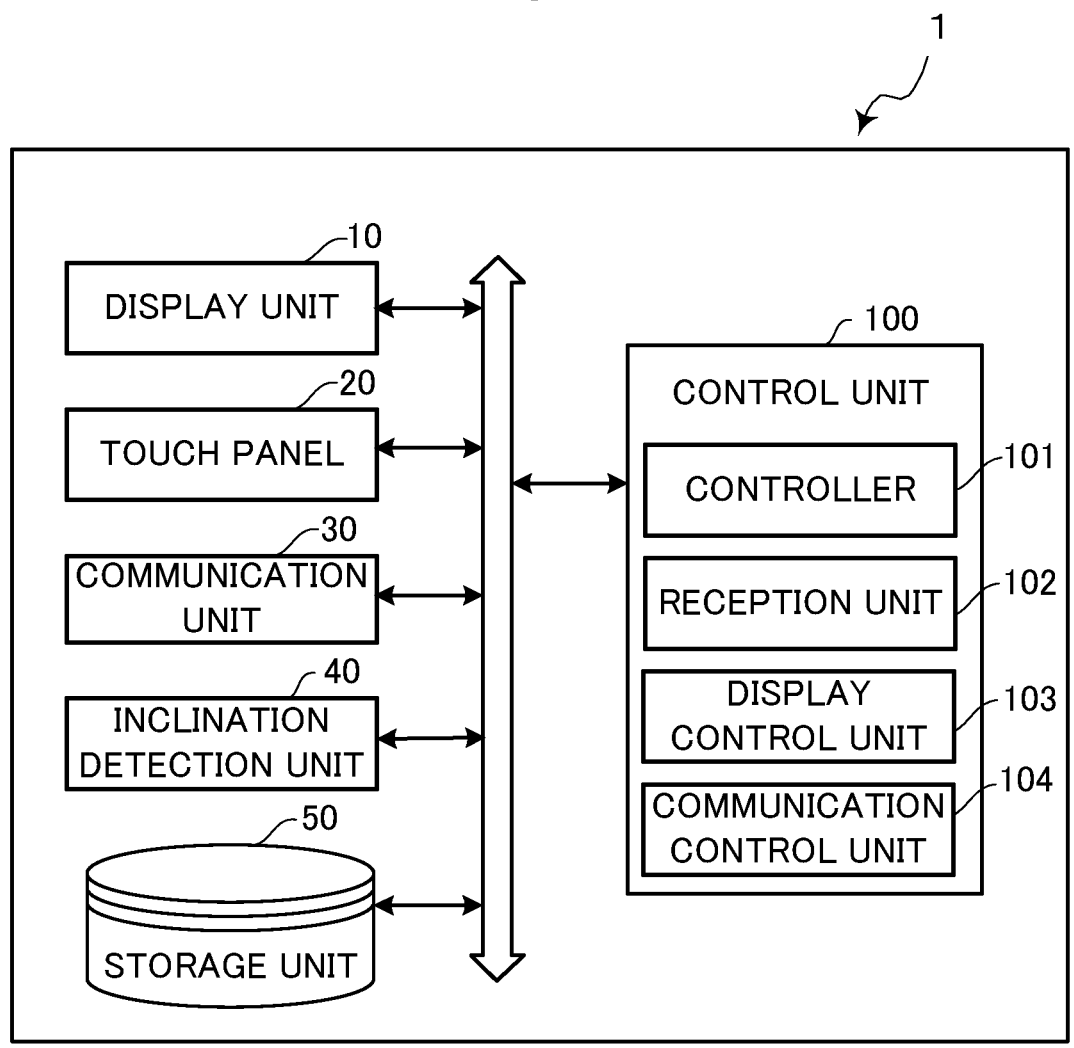
FIG. 2 is a block diagram showing an internal configuration of the display device according to the embodiment 1.

FIG. 1 is a plane view showing an appearance of a display device according to an embodiment 1 of the present invention. FIG. 2 is a block diagram showing an internal configuration of the display device according to the embodiment 1 of the present invention.

The display device 1 according to the embodiment 1 of the present invention is, for example, a mobile terminal device such as a smartphone, and includes a display unit 10, a touch panel 20, a communication unit 30, an inclination detection unit 40, a storage unit 50, and a control unit 100. The mentioned components are configured to transmit and receive data or signals to and from each other, via a CPU bus.

The display unit 10 is, for example, constituted of a liquid crystal display (LCD), or an organic light-emitting diode (OLED). As shown in FIG. 1, the display unit 10 displays an operation screen D1, in which a plurality of icons A1 to A9 are arranged. The icons A1 to A9 are each associated with one of predetermined functions that the display device 1 is configured to perform, and represent an image indicating the function associated with the icon. For example, the icon A1 is associated with a mail function, and the icon A2 is associated with an internet browser function.

The touch panel 20 is based on what is known as a resistive film or electrostatic capacitance. The touch panel 20 is provided on the front face of the display unit 10, to detect a contact of the user on the operation screen displayed by the display unit 10, as well as the position of the contact. Upon detecting a contact of the user, the touch panel 20 outputs a detection signal indicating a coordinate position of the contact position to a reception unit 102 of the control unit 100, which will be subsequently described. Thus, the touch panel 20 serves as an operation unit, through which the user's operation, performed on the operation screen displayed by the display unit 10, is inputted.

Here, the touch panel 20 includes such a type that detects a finger when the finger is located within a predetermined distance from the operation screen, though the finger has not made a direct contact with the operation screen. Accordingly, the term "contact" referred to in this embodiment will also include the mentioned situation that the touch panel 20 detects the finger located within the predetermined distance from the operation screen, though the finger has not made a direct contact with the operation screen.

The display device 1 may also include physical keys, as part of the operation unit for inputting the user's operation, in addition to the touch panel 20. The physical keys may include, for example, arrow keys, a page-up key, and a page-down key.

The communication unit 30 is a communication interface including a communication module such as a non-illustrated LAN chip. The display device 1 is connected to other information processing apparatuses, such as a personal computer (PC) via a network, and transmits and receives data to and from the PC, through the communication unit 30.

The inclination detection unit 40 is constituted of what is known as a gyro sensor, and detects an inclination of the display unit 10. The inclination detection unit 40 outputs, upon detecting the inclination of the display unit 10, a detection signal indicating the detected inclination, to a display control unit 103 of the control unit 100 to be subsequently described.

The storage unit 50 is a large-capacity storage device, such as a hard disk drive (HDD).

The control unit 100 includes a central processing unit (CPU), a random-access memory (RAM), a read-only memory (ROM), and so forth. The control unit 100 acts as a controller 101, the reception unit 102, a display control unit 103, and a communication control unit 104, when the CPU executes a display control program stored in the ROM or the storage unit 50. Here, the above-cited components of the control unit 100 may each be constituted of a hardware circuit, instead of being realized by the operation based on the display control program.

The controller 101 serves to control the overall operation of the display device 1. The controller 101 is connected to the display unit 10, the touch panel 20, the communication unit 30, the inclination detection unit 40, and the storage unit 50, to control the mentioned units connected to the controller 101, and transmit and receive data or signals to and from these units.

The controller 101 acts, in particular, as a processing unit to execute the process corresponding to the operation received by the reception unit 102 to be subsequently described. For example, when the user selects an icon A1 shown in FIG. 1 using the touch panel function, and the reception unit 102 receives the touch operation (also referred to as selecting operation), the controller 101 executes the mail function, which is associated with the icon A1. More specifically, the controller 101 executes a mail program stored in the storage unit 50 or another memory.

The reception unit 102 identifies the operation inputted by the user, on the basis of the detection signal outputted from the touch panel 20. The reception unit 102 then receives the user's operation identified as above, and outputs a control signal corresponding to the user's operation to the controller 101, the display control unit 103, and the communication control unit 104.

The user operation includes, for example, a touch operation, a slide operation (including a flick operation and a swipe operation), a drag operation, a pinch-out operation, and a pinch-in operation. For example, when the user puts the finger on the touch panel 20 and then withdraws the finger from the touched position, the touch panel 20 outputs a detection signal indicating the position where the contact has been detected, to the reception unit 102. Upon receipt of the detection signal, the reception unit 102 identifies that the operation inputted by the user is the touch operation, and receives the touch operation. When the user moves the finger on the touch panel 20 keeping the finger in contact therewith, the touch panel 20 outputs a detection signal indicating the movement between the initial position where the contact has been detected first, and the final position where the contact has been detected last, to the reception unit 102. Upon receipt of the detection signal, the reception unit 102 identifies that the operation inputted by the user is the slide operation, and receives the slide operation.

The communication control unit 104 serves to control the communicating operation performed by the communication unit 30.

Figure 3:
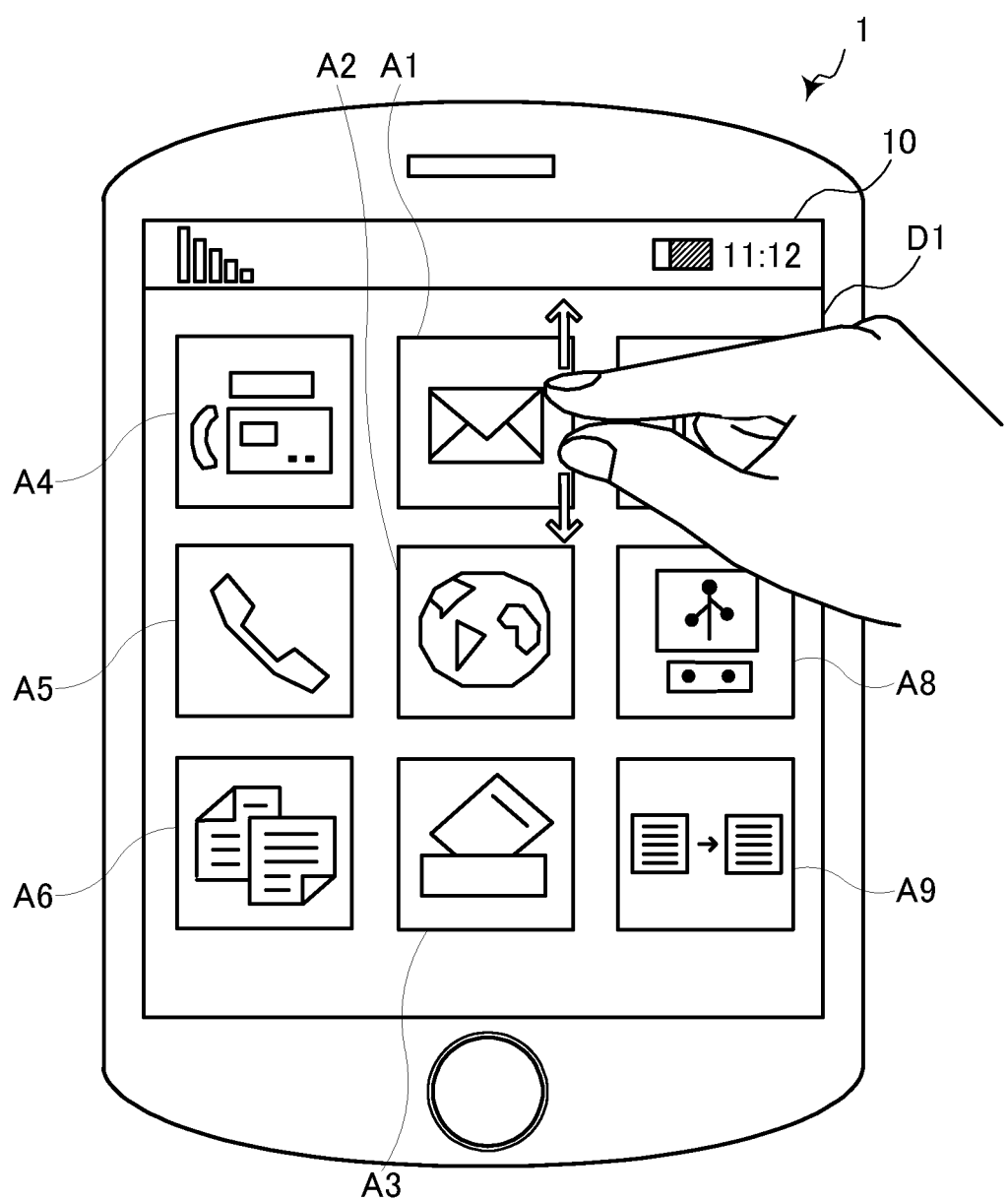
FIG. 3 is a view showing a pinch-out operation performed to enlarge an icon.
Figure 4:
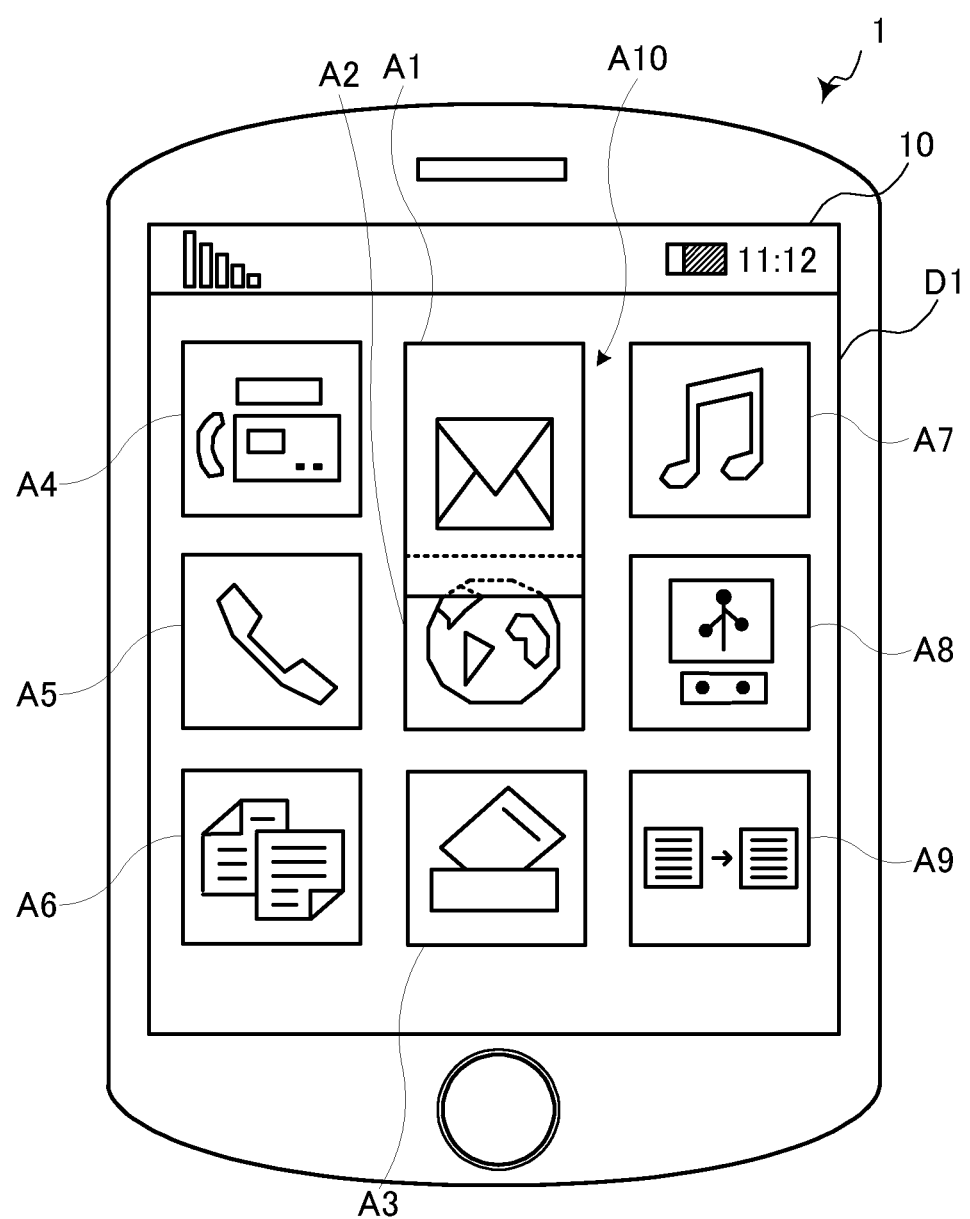
FIG. 4 is a view showing an operation screen that appears after the pinch-out operation.

The display control unit 103 serves to control the displaying operation performed by the display unit 10. The display control unit 103 changes (enlarges or shrinks) the shape of icons A1 to A9 arranged on the operation screen D1. More specifically, when the reception unit 102 receives a pinch-out operation performed on one of the icons A1 to A9, the display control unit 103 enlarges the shape of the icon on which the pinch-out operation has been made, to the size designated by the pinch-out operation. In the example shown in FIG. 3, the pinch-out operation performed on the icon A1 in the up-down direction in the drawing is inputted. In this case, the display control unit 103 enlarges (expands) the icon A1 in the up-down direction in the drawing, and causes the display unit 10 to display the icon A1 that has been enlarged. In the example shown in FIG. 4, the clearance between the icon A1 and the icon A2 adjacent thereto is narrowed, to such an extent that the allocated area of the icon A1 and the allocated area of the icon A2 overlap, as result of the enlarging of the icon A1. In this case, the display control unit 103 generates a synthesized icon A10 by superposing the icon A1 and the icon A2 on each other, and causes the display unit 10 to display the synthesized icon A10.

Here, a plurality of staged values, each indicating the clearance that allows location of the icons adjacent to each other, are stored in advance in the storage unit 50. The display control unit 103 determines the allocated area of the enlarged icon, by looking up the values stored in the storage unit 50. More specifically, the display control unit 103 selects, when the clearance between the enlarged icon and another icon adjacent thereto is changed, one of the plurality of staged values stored in the storage unit 50, according to the clearance that has been changed. Then the display control unit 103 determines the allocated area of the enlarged icon, such that the clearance between the enlarged icon and the icon adjacent thereto accords with the selected value. Further, the display control unit 103 adjusts the size of the enlarged icon, such that the clearance between the enlarged icon and the icon adjacent thereto accords with the selected value.

Figure 5:
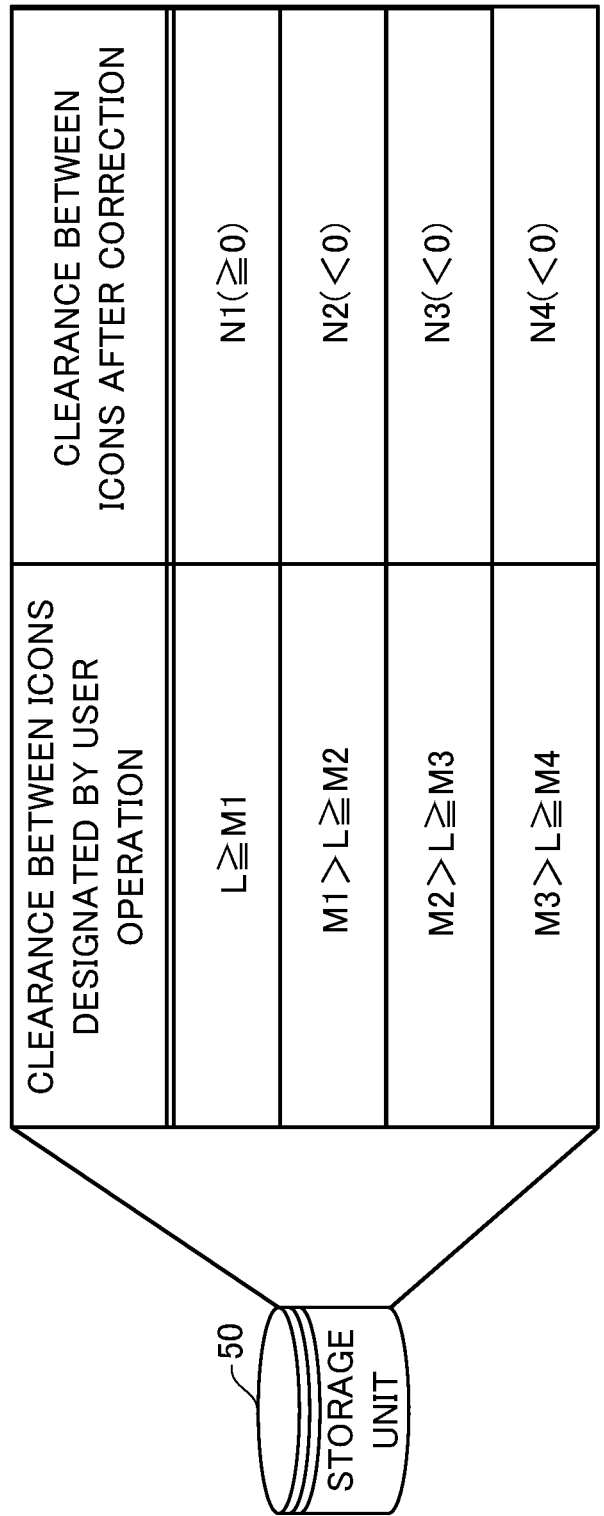
FIG. 5 is a view showing examples of staged values stored in advance in a storage unit.

Referring to FIG. 5 and FIG. 6A to FIG. 6F, the determination of the allocated area of the icon, and the synthesis of the icon performed by the display control unit 103 will be described in further detail. FIG. 5 is a table showing examples of the staged values stored in advance in the storage unit 50. FIG. 6A is a view showing the clearance between the icon A1 and the icon A2 in the initial allocated area, and FIG. 6B to FIG. 6F are views each showing how the clearance is corrected by the display control unit 103, when the clearance between the icon A1 and the icon A2 is changed, as result of enlarging the icon A1 by the pinch-out operation. In each of FIG. 6B to FIG. 6F, the upper section illustrates the clearance between the icons designated by the pinch-out operation, and the lower section illustrates the clearance between the mentioned icons, corrected by the display control unit 103.

As shown in FIG. 5, the storage unit 50 contains the ranges of the clearance between the icons corresponding to each of the staged values. The display control unit 103 determines which of the plurality of ranges the clearance between the icons designated by the pinch-out operation falls on. Then the display control unit 103 selects the value corresponding to the determined range, out of the plurality of staged values stored in the storage unit 50.

Now, it will be assumed that the clearance between the icon A1 and the icon A2 has been changed from L1 to L2 as shown in the upper section in FIG. 6A and FIG. 6B, as result of the enlarging of the icon A1 by the pinch-out operation performed on the icon A1. In this case, the clearance L2 becomes equal to or wider than a width M1, and therefore the clearance between the icons after the correction becomes N1, as shown in FIG. 5. Accordingly, the display control unit 103 determines the allocated area of the icon A1, such that the clearance between the icon A1 and the icon A2 accords with the width N1 (see lower section of FIG. 6B). In addition, the display control unit 103 adjusts the size of the enlarged icon A1, such that the clearance between the enlarged icon A1 and the icon A2 adjacent thereto accords with the selected value N1 (see lower section of FIG. 6B).

In the case where the clearance between the icon A1 and icon A2 has been changed from L1 to L3 as shown in the upper section in FIG. 6A and FIG. 6C, the clearance L3 is narrower than the width M1 and equal to or wider than a width M2, and therefore the clearance between the icons after the correction becomes N2, as shown in FIG. 5. Since the width N2 is narrower than 0, in this case the allocated areas of the respective icons overlap. Accordingly, the display control unit 103 generates the synthesized icon A10, by superposing the icon A1 and the icon A2 on each other (see lower section in FIG. 6C).

When the clearance between the icon A1 and icon A2 is further reduced from L3 so as to become L4 or L5 (see upper section of FIG. 6D and FIG. 6E), the clearance L4 or L5 is narrower than the width M1 and equal to or wider than the width M2, and therefore the clearance between the icons after the correction becomes N2. Thus, even when the clearance between the icons designated by the pinch-out operation, and the sizes of those icons are different, the clearance between the icons and the sizes of the icons may become the same, as result of the correction by the display control unit 103, as shown in the lower section of FIG. 6C to FIG. 6E).

When the clearance between the icon A1 and icon A2 is further reduced from L5 so as to become L6 as shown in the upper section of FIG. 6F, the clearance L6 is narrower than the width M2 and wider than a width M3, and therefore the clearance between the icons after the correction becomes N3.

In the case where the display control unit 103 generates the synthesized icon by superposing the icons on each other, through the mentioned process of determining the allocated area of the icon and synthesizing the icon, the clearance between the icons becomes one of the plurality of predetermined staged values. In the case where the icons in the synthesized icon are unlimitedly permitted to overlap, the appearance of the operation screen displaying such icons may become so complicated that the visual recognizability of the operation screen and the icons is degraded. However, with the display device according to the embodiment 1 of the present invention, the extent of the overlapping in the synthesized icon is limited to a plurality of predetermined patterns. Such an arrangement prevents the appearance of the operation screen displaying the synthesized icon from being complicated, thereby preventing the degradation in visual recognizability of the operation screen and the icons.

Although the foregoing description represents the case where the display control unit 103 determines which of the plurality of ranges stored in the storage unit 50 the clearance between the icons falls on, and selects the value corresponding to the determined range as the clearance between the icons after the correction, the present invention is not limited to the mentioned arrangement. The display control unit 103 may select a value closest to the changed clearance between the icons, out of the plurality of staged values stored in the storage unit 50, as the clearance between the icons after the correction.

Further, when the reception unit 102 receives the drag operation performed on one of the icons A1 to A9, the display control unit 103 changes the allocated area of the icons from the start point of the drag operation to the end point thereof. With respect to the change of the clearance between the moved icon and another icon adjacent thereto, resultant from the drag operation, the display control unit 103 selects, similarly to the above, one of the plurality of staged values stored in the storage unit 50, according to the clearance that has been changed, and determines the allocated area of the moved icon, such that the clearance between the moved icon and the icon adjacent thereto accords with the selected value. When the allocated areas of the respective icons overlap, the display control unit 103 generates the synthesized icon by superposing the icons on each other.

Further, when the reception unit 102 receives the pinch-in operation performed on one of the icons A1 to A9, the display control unit 103 shrinks the shape of the icon on which the pinch-in operation has been made, to the size designated by the pinch-in operation.

Hereunder, the synthesized icon generated by the display control unit 103 will be described. FIG. 7 is a view showing a synthesized icon A10. As shown in FIG. 7, the synthesized icon A10 is composed of three regions, namely a first region S1 and a second region S2 where the allocated areas of the icon A1 and the icon A2 are not overlapping, and a third region S3 where the allocated areas of the icon A1 and the icon A2 are overlapping. In the first region S1, an image indicating the function associated with the icon A1 is displayed, and in the second region S2 an image indicating the function associated with the icon A2 is displayed. In the third region S3, a synthesized image, generated on the basis of both of the image indicating the function associated with the icon A1 and the image indicating the function associated with the icon A2, is displayed. More specifically, the display control unit 103 generates the synthesized image by converting the image included in the icon A1 into a semi-transparent image, so that the image in the other icon, namely the icon A2, can be visually recognized through the semi-transparent image. Therefore, the user can visually recognize the image indicating the function associated with the icon A2, through the image indicating the function associated with the icon A1 (see dot lines in FIG. 7).

When generating the synthesized icon from the icons, the allocated areas of which are overlapping, the display control unit 103 determines the overlapping order of the icons. When the allocated areas of the respective icons overlap as result of the enlarging of the icon, the display control unit 103 sets the enlarged icon to the highest place in the overlapping order. In the example shown in FIG. 7, the icon A1 overlaps with the icon A2 upon being enlarged, and therefore the icon A1 is set to a higher place in the overlapping order, than the icon A2. Accordingly, the display control unit 103 converts the image included in the icon A1 into the semi-transparent image, so that the image in the icon A2 can be visually recognized through the semi-transparent image of the icon A1, thus generating the synthesized image, and causes the display unit 10 to display the synthesized image. Conversely, when the icon A2 overlaps with the icon A1 upon being enlarged, the display control unit 103 converts the image included in the icon A2 into the semi-transparent image, so that the image in the icon A1 can be visually recognized through the semi-transparent image of the icon A2, thus generating the synthesized image, and causes the display unit 10 to display the synthesized image. Further, in the case where the allocated areas of the respective icons overlap as result of the drag operation to move the icon, the display control unit 103 sets the icon that has been moved to the highest place in the overlapping order.

When the reception unit 102 receives the operation for selecting the region where the icon A1 and the icon A2 are not overlapping, the controller 101 executes the function associated with the icon displayed in the selected region. More specifically, when the reception unit 102 receives the touch operation performed on the first region S1, the controller 101 executes the mail function, which is the function associated with the icon A1 displayed in the first region S1. When the reception unit 102 receives the touch operation performed on the second region S2, the controller 101 executes the browser function, which is the function associated with the icon A2 displayed in the second region S2.

Further, when the reception unit 102 receives the operation for selecting the third region S3 where the icon A1 and the icon A2 are overlapping, the controller 101 executes the function associated with the icon in the highest place in the overlapping order, out of the functions respectively associated with the icons overlapping in the third region S3. In other words, the controller 101 executes the function associated with the icon representing the image semi-transparently displayed on the display unit 10. In the example shown in FIG. 8A, since the icon A1 is in the higher place in the overlapping order than the icon A2, the controller 101 executes the mail function, which is the function associated with the icon A1.

Figure 8A:
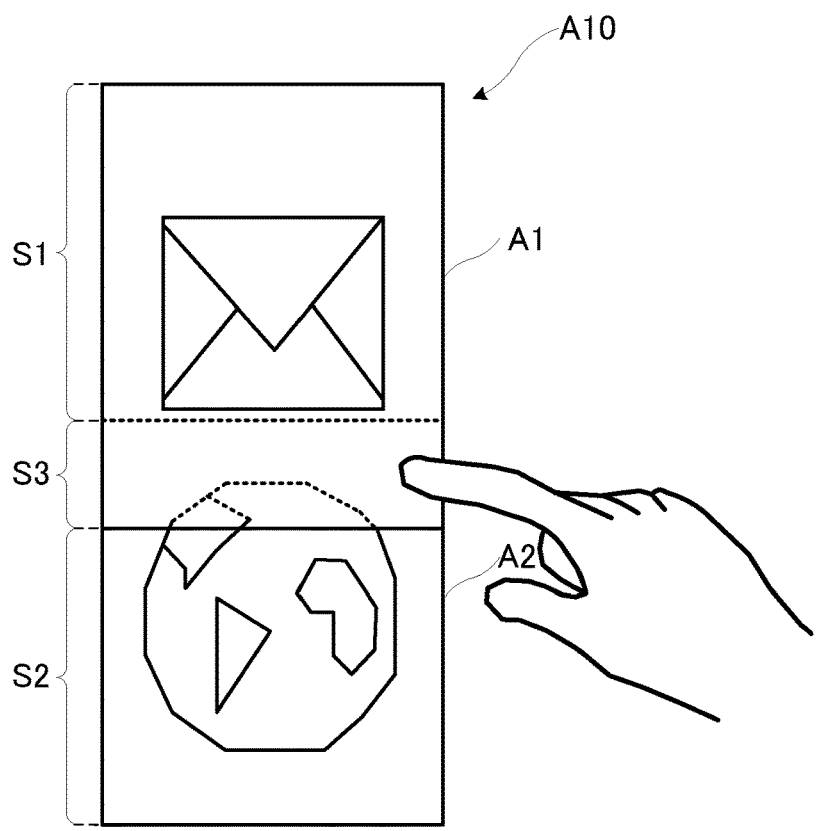
FIGS. 8A and 8B are views each showing an example of an operation performed on the synthesized icon.

In contrast, when the user touches the region where the icon A1 and the icon A2 are overlapping, namely the third region S3, the function to be executed by the controller 101 varies depending on the direction in which the user slides the finger, after touching the screen. In the example shown in FIG. 8A and FIG. 8B, the user has moved the finger, after touching the third region S3, to the second region S2 keeping the finger in contact with the screen (slide operation). In this case, the controller 101 executes the function associated with the icon A2 displayed at the end point of the slide operation, namely the browser function. Conversely, in the example shown in FIG. 9A and FIG. 9B, the user has moved the finger to the first region S1, keeping the finger in contact with the screen. In this case, the controller 101 executes the function associated with the icon A1 displayed at the end point of the slide operation, namely the mail function. Thus, when the reception unit 102 receives the slide operation starting from a point in the third region S3 of the synthesized icon A10 where the icons are overlapping, the controller 101 executes the function associated with the icon corresponding to the end point of the slide operation, out of the functions respectively associated with the icons overlapping in the third region S3.

Figure 8B:
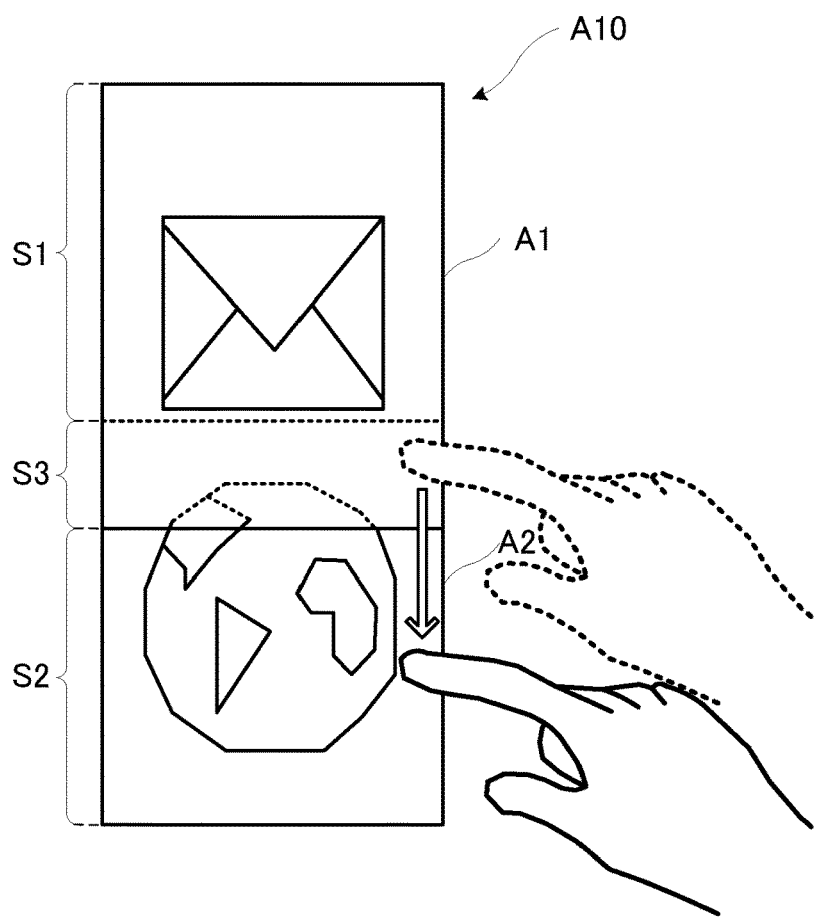
Figure 9A:
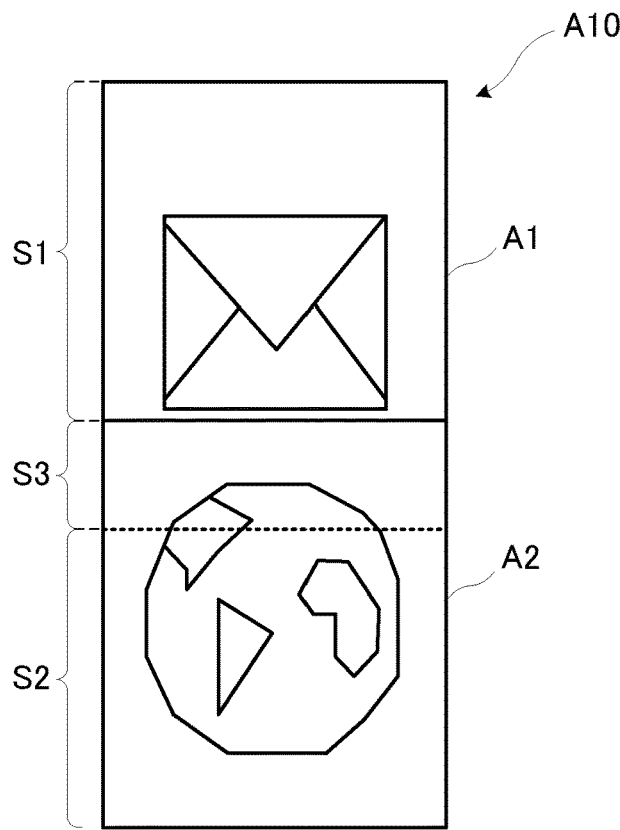
FIGS. 9A and 9B are views each showing another example of the operation performed on the synthesized icon.
Figure 9B:
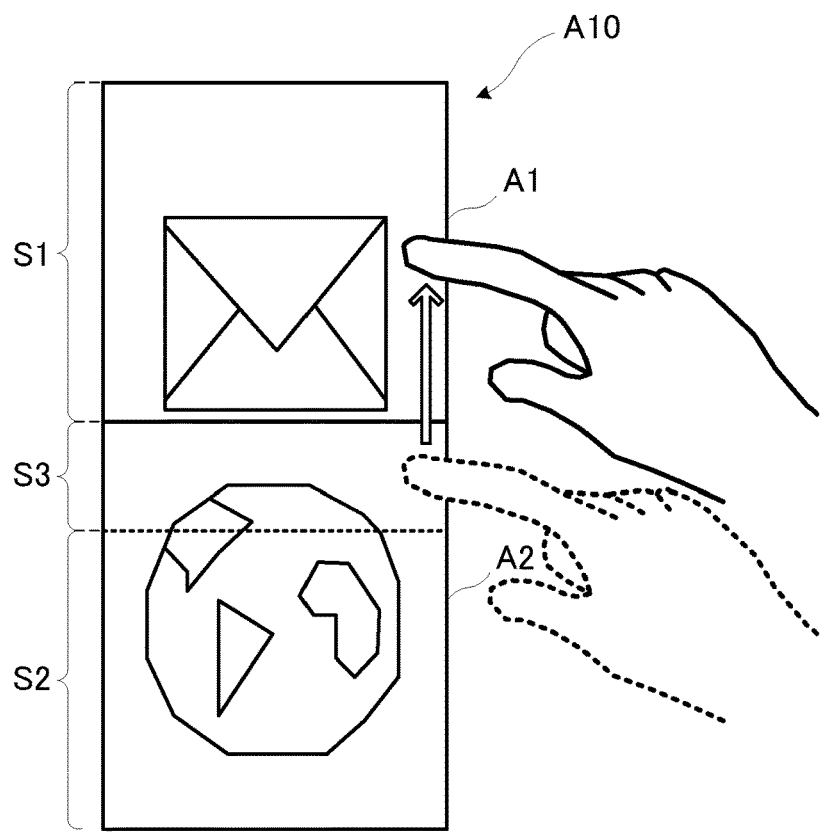

Here, when the user has moved the finger, after touching the third region S3, to the second region S2 keeping the finger in contact with the screen, the display control unit 103 brings the icon A2 displayed in the second region S2 to the highest place in the overlapping order, and changes the display in the third region S3 (see FIG. 8B). More specifically, the display control unit 103 updates the synthesized image by turning the image represented by the icon A2 into the semi-transparent image, so that the image represented by the icon A1 is visually recognized through the semi-transparent image represented by the icon A2, and causes the display unit 10 to display the synthesized icon having the updated synthesized image. Thus, when the reception unit 102 receives the slide operation starting from a point in the third region S3 of the synthesized icon where the icons are overlapping, the controller 101 brings the icon displayed at the end point of the slide operation to the highest place in the overlapping order, generates the synthesized icon by stacking the icons according to the changed overlapping order, and causes the display unit 10 to display the synthesized icon.

Figure 10:
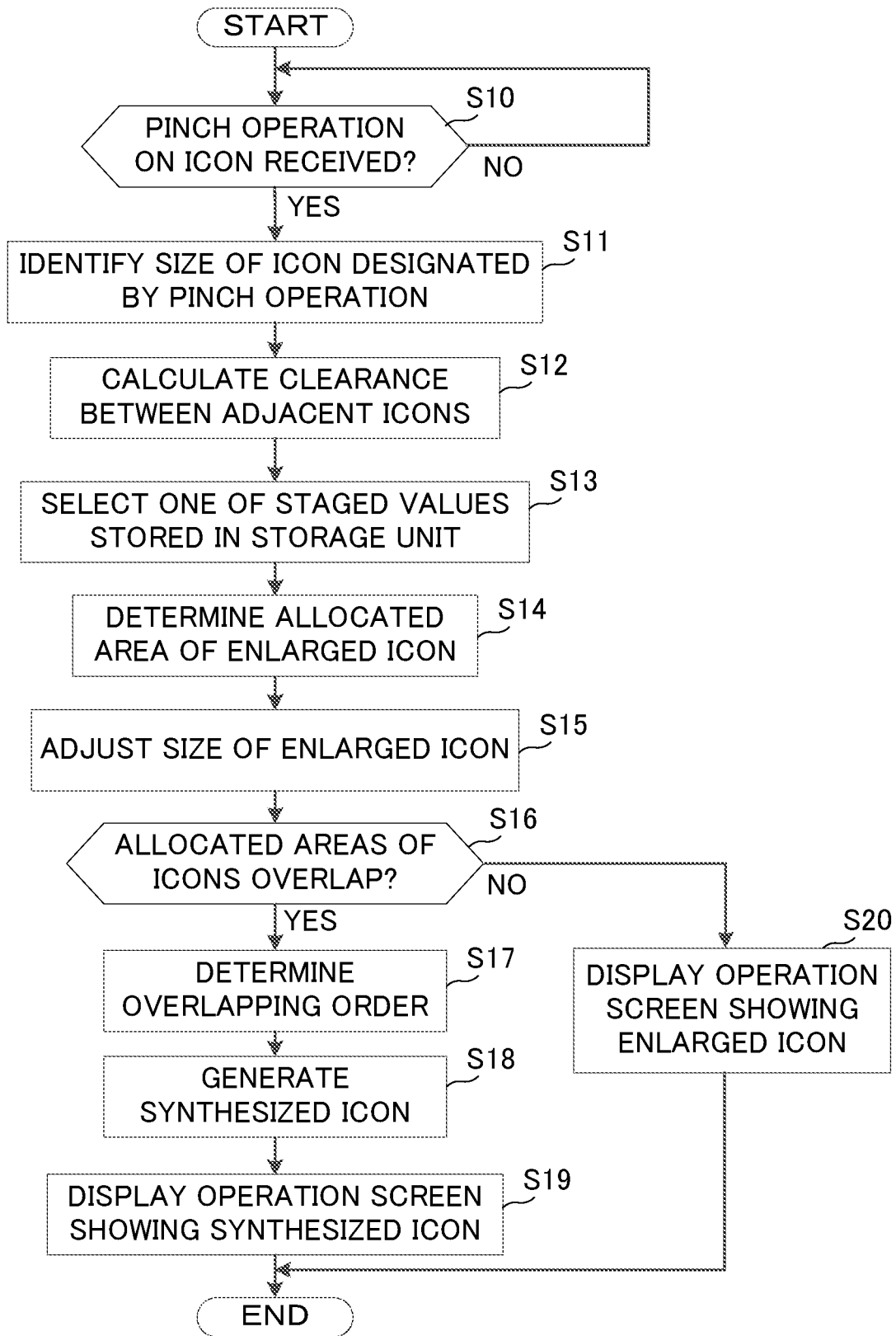
FIG. 10 is a flowchart showing a synthesizing process of the icon, performed by the display device according to the embodiment 1.

Hereunder, an operation of the display device 1 configured as above will be described. FIG. 10 is a flowchart showing a synthesizing process of the icon, performed by the display device 1. When the reception unit 102 receives the pinch-out operation performed on the icon (YES at step S10), the display control unit 103 identifies the size of the icon that has been designated and enlarged by the pinch-out operation (step S11). Then the display control unit 103 calculates the clearance between the enlarged icon and the icon adjacent thereto (step S12).

After step S12, the display control unit 103 selects one of the plurality of staged values stored in the storage unit 50 on the basis of the calculated clearance between the icons, as the clearance after the correction (step S13). The display control unit 103 determines the allocated area of the enlarged icon (step S14) and adjusts the size of the enlarged icon (step S15), according to the selected value.

When the allocated areas of the enlarged icon and the icon adjacent thereto overlap as result of the process of step S14 and step S15 (YES at step S16), the display control unit 103 determines the overlapping order of the enlarged icon and the icon adjacent thereto (step S17), and generates the synthesized icon, in which the enlarged icon and the icon adjacent thereto overlap in the determined overlapping order (step S18). Then the display control unit 103 causes the display unit 10 to display the operation screen including the synthesized icon generated as above (step S19).

When the allocated areas of the enlarged icon and the icon adjacent thereto are not overlapping (NO at step S16), the display control unit 103 causes the display unit 10 to display the operation screen including the enlarged icon (step S20).

Figure 11:
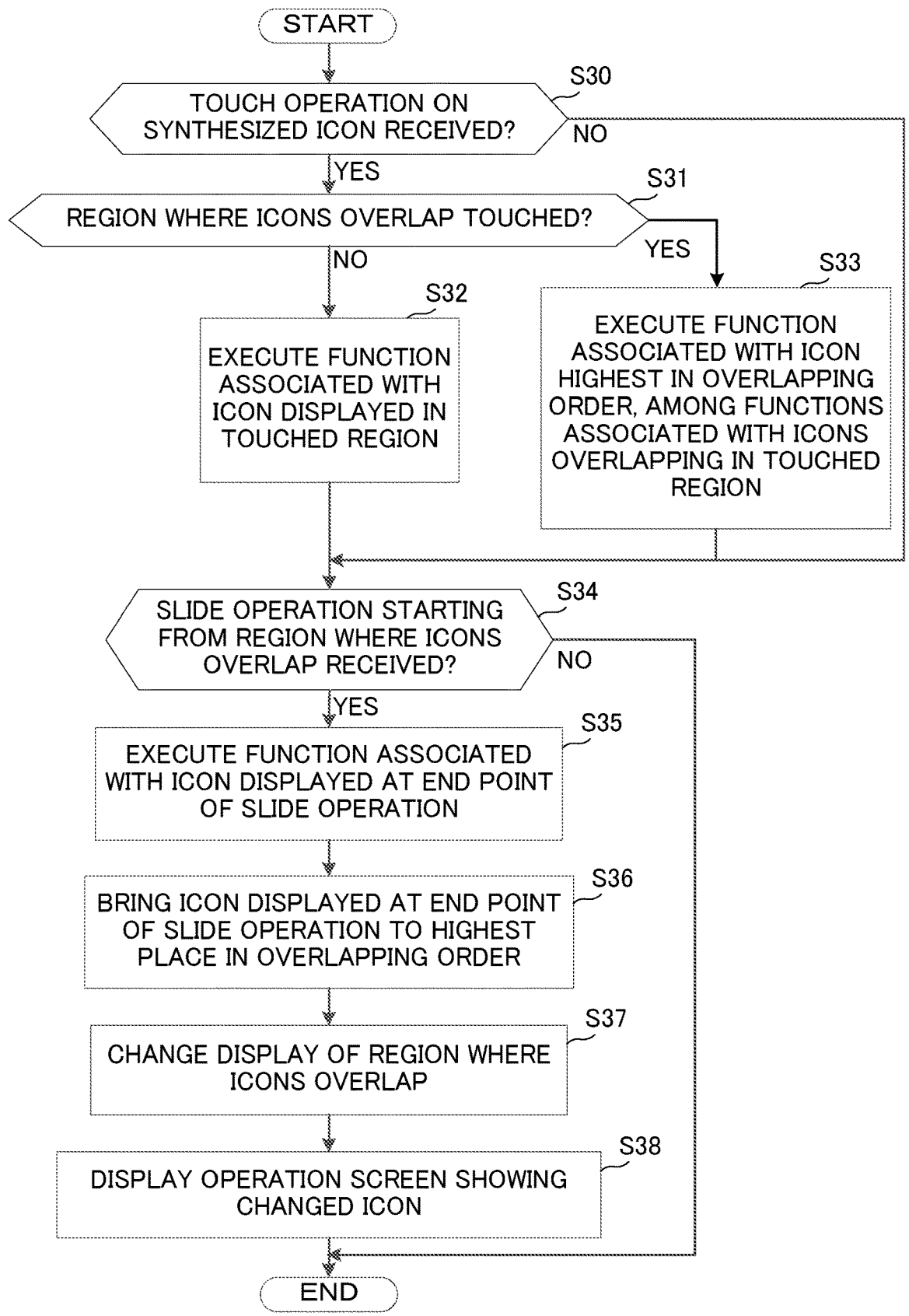
FIG. 11 is a flowchart showing an instruction reception process with respect to the synthesized icon, performed by the display device according to the embodiment 1.

FIG. 11 is a flowchart showing an instruction reception process with respect to the synthesized icon, performed by the display device 1. When the reception unit 102 receives the touch operation performed on the synthesized icon (YES at step S30), and the icons in the touched region are not overlapping (NO at step S31), the controller 101 executes the function associated with the icon displayed in the touched region (step S32). In contrast, when the icons are overlapping in the touched region (YES at step S31), the controller 101 executes the function associated with the icon in the highest place in the overlapping order, in other words the function associated with the icon that is semi-transparently displayed, out of the functions respectively associated with the icons overlapping in the touched region (step S33).

When the reception unit 102 receives the slide operation starting from a point in the region where the icons are overlapping in the synthesized icon (YES at step S34), the controller 101 executes the function associated with the icon displayed at the end point of the slide operation (step S35). Then the display control unit 103 brings the icon displayed at the end point of the slide operation to the highest place in the overlapping order (step S36), and changes the display of the region where the icons are overlapping, according to the changed overlapping order (step S37). After step S37, the display control unit 103 causes the display unit 10 to display the operation screen including the changed icons (step S38).

As described thus far, the display device 1 according to the embodiment 1 enables, when the allocated areas of the respective icons overlap, the synthesized icon to be generated, and the operation made by the user on the synthesized icon to be received. In addition, the slide operation performed on the third region S3, where the icons are overlapping, enables selection of the function to be executed by the display device 1, out of the plurality of functions respectively associated with the icons overlapping in the third region S3.

[Variations]

Although the foregoing embodiment represents the case where the allocated areas of two icons overlap, and the display control unit 103 synthesizes the two icons, the present invention encompasses different arrangements. When the allocated areas of three or more icons overlap, the display control unit 103 may synthesize the corresponding three or more icons.

Figure 12:
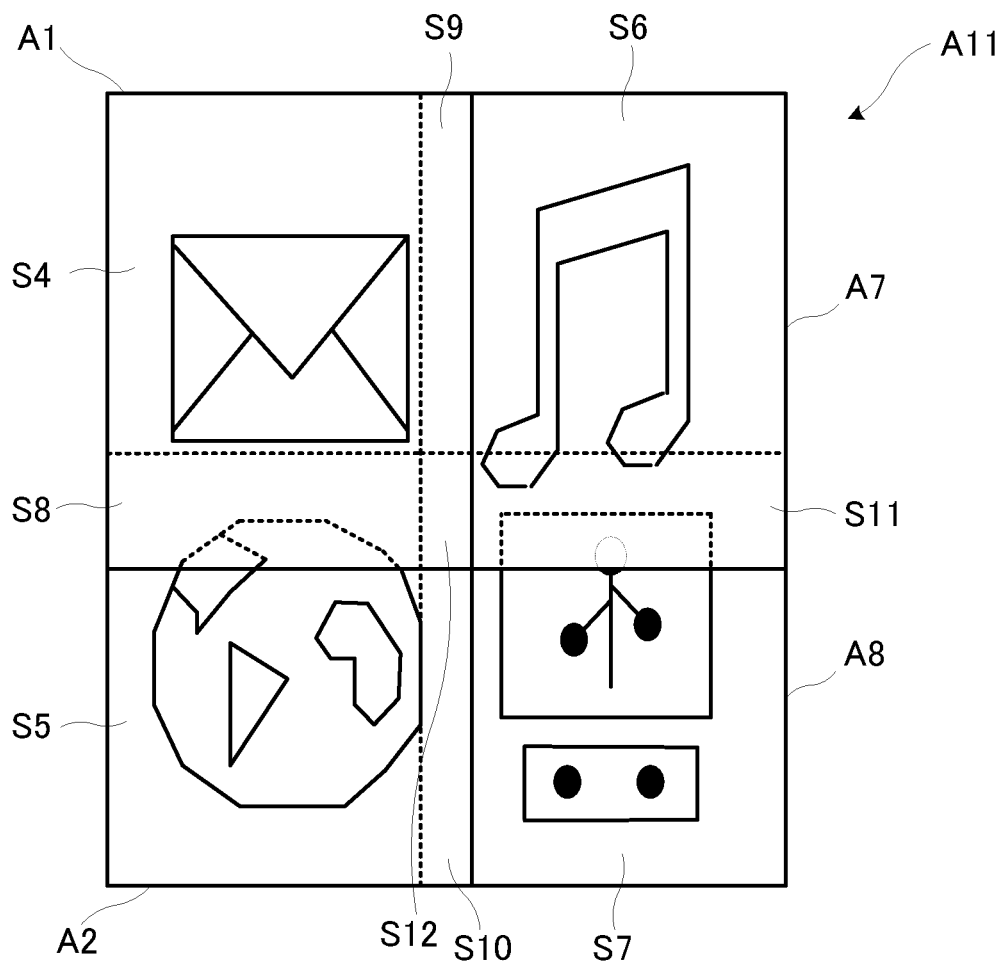
FIG. 12 is a view showing another example of the synthesized icon.

In the example shown in FIG. 12, the allocated areas of four icons, namely the icon A1, the icon A2, the icon A7, and the icon A8, are overlapping. In this case, a synthesized icon A11 is composed of nine regions, namely a first region S4, a second region S5, a third region S6, and a fourth region S7 where no icons are overlapping, and a fifth region S8, a sixth region S9, a seventh region S10, an eighth region S11, and a ninth region S12 where the icons are overlapping. In the fifth region S8, the icon A1 and the icon A2 are overlapping, in the sixth region S9 the icon A1 and the icon A7 are overlapping, in the seventh region S10 the icon A2 and the icon A8 are overlapping, in the eighth region S11 the icon A7 and the icon A8 are overlapping, and in the ninth region S12, the icon A1, the icon A2, the icon A7, and the icon A8 are overlapping.

Figure 13A:
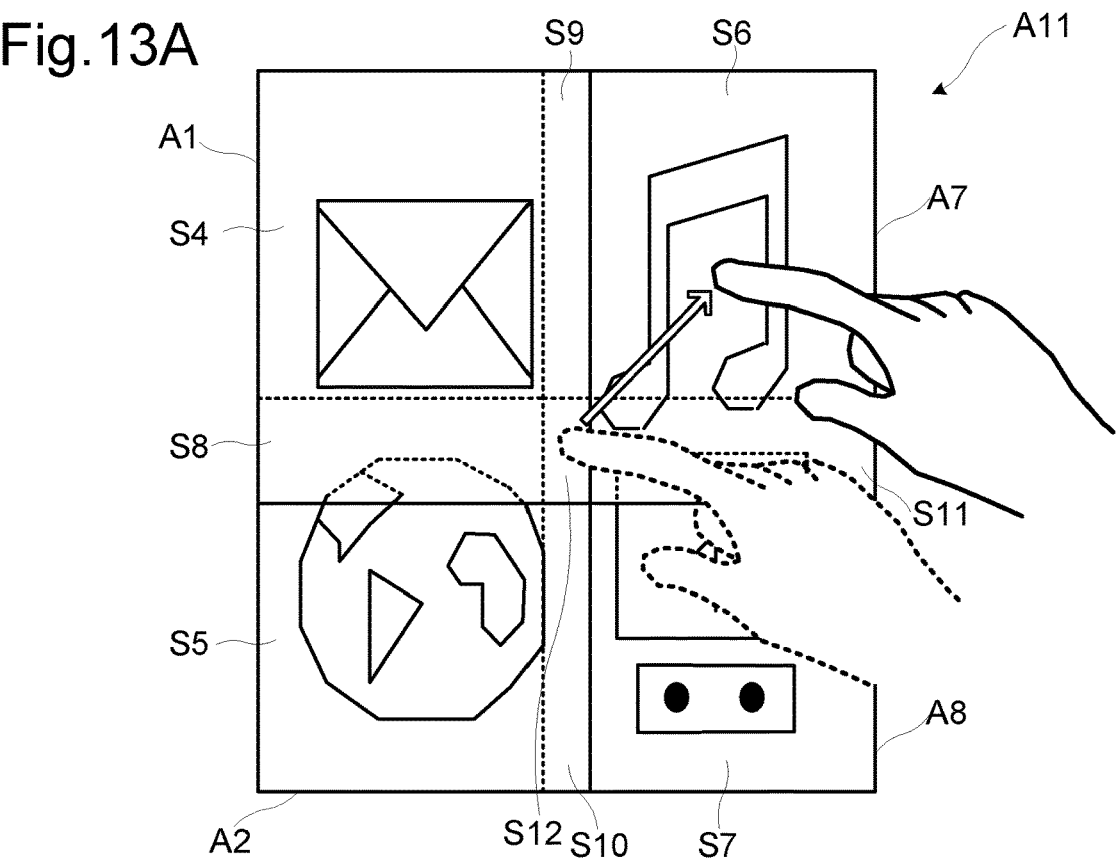
FIGS. 13A and 13B are views each showing an example of an operation performed on the synthesized icon.
Figure 13B:
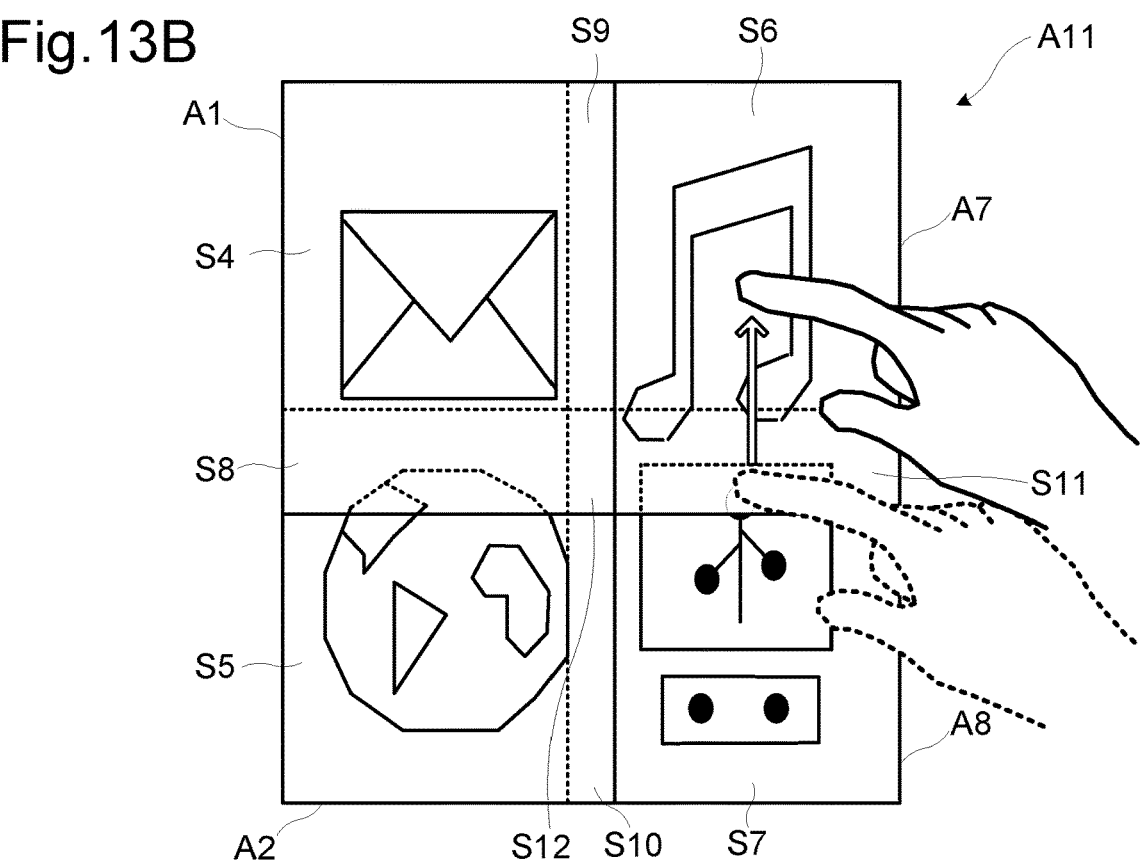

In the example shown in FIG. 13A, the user has put the finger on the ninth region S12 and moved the finger to the third region S6 (slide operation). In this case, the controller 101 executes the function associated with the icon A7, displayed at the end point of the slide operation. In the example shown in FIG. 13B, the user has put the finger on the eighth region S11 and moved the finger to the third region S6. In this case also, the controller 101 executes the function associated with the icon A7, displayed at the end point of the slide operation.

Embodiment 2

In the display device 1 according to an embodiment 2, when the reception unit 102 receives an operation for selecting a point in the region where the icons are overlapping in the synthesized icon, the controller 101 executes each of the functions associated with the icons overlapping in the touched region.

Figure 14:
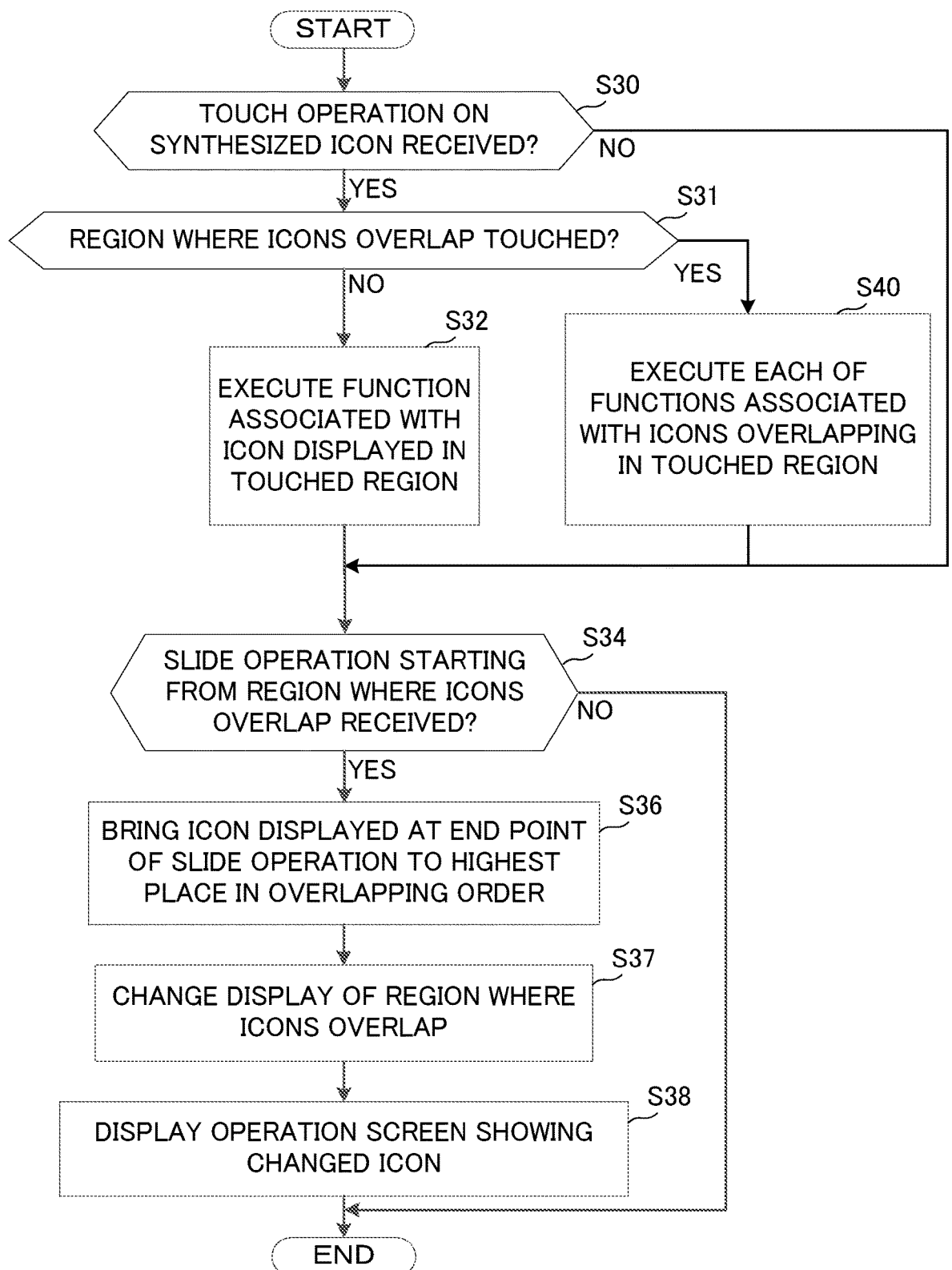
FIG. 14 is a flowchart showing an instruction reception process with respect to the synthesized icon, performed by a display device according to an embodiment 2.

FIG. 14 is a flowchart showing an instruction reception process with respect to the synthesized icon, performed by the display device 1 according to the embodiment 2. The same processes as those of the flowchart shown in FIG. 11 are given the same numeral, and the description thereof may be omitted or simplified.

When the reception unit 102 receives the touch operation performed on the synthesized icon (YES at step S30), and the icons in the touched region are not overlapping (NO at step S31), the controller 101 executes the function associated with the icon displayed in the touched region (step S32).

In contrast, when the icons are overlapping in the touched region (YES at step S31), the controller 101 executes each of the functions associated with the icons overlapping in the touched region (step S40). When the reception unit 102 receives the touch operation performed on the third region S3 as shown in FIG. 8A, the controller 101 executes both of the functions associated with the icon A1 and the icon A2 overlapping in the third region S3, namely both of the mail function and the browser function.

When the reception unit 102 receives the slide operation starting from a point in the region where the icons are overlapping in the synthesized icon (YES at step S34), the process of step S35 is skipped, and the display control unit 103 brings the icon displayed at the end point of the slide operation to the highest place in the overlapping order (step S36), and changes the display of the region where the icons are overlapping, according to the changed overlapping order (step S37). After step S37, the display control unit 103 causes the display unit 10 to display the operation screen including the changed icons (step S38).

As described above, with the configuration according to the embodiment 2, the touch operation performed on the third region S3, where the icons are overlapping, enables the display device 1 to execute the functions respectively associated with the icons overlapping in the third region S3.

Embodiment 3

In the display device 1 according to an embodiment 3, when the reception unit 102 receives the slide operation starting from a point in the region where the icons are overlapping in the synthesized icon, display control unit 103 executes the function associated with a first icon displayed at the end point of the slide operation, out of the functions respectively associated with the icons overlapping in the region, and executes the function associated with a second icon other than the first icon, with lower priority than the function associated with the first icon.

Figure 15:
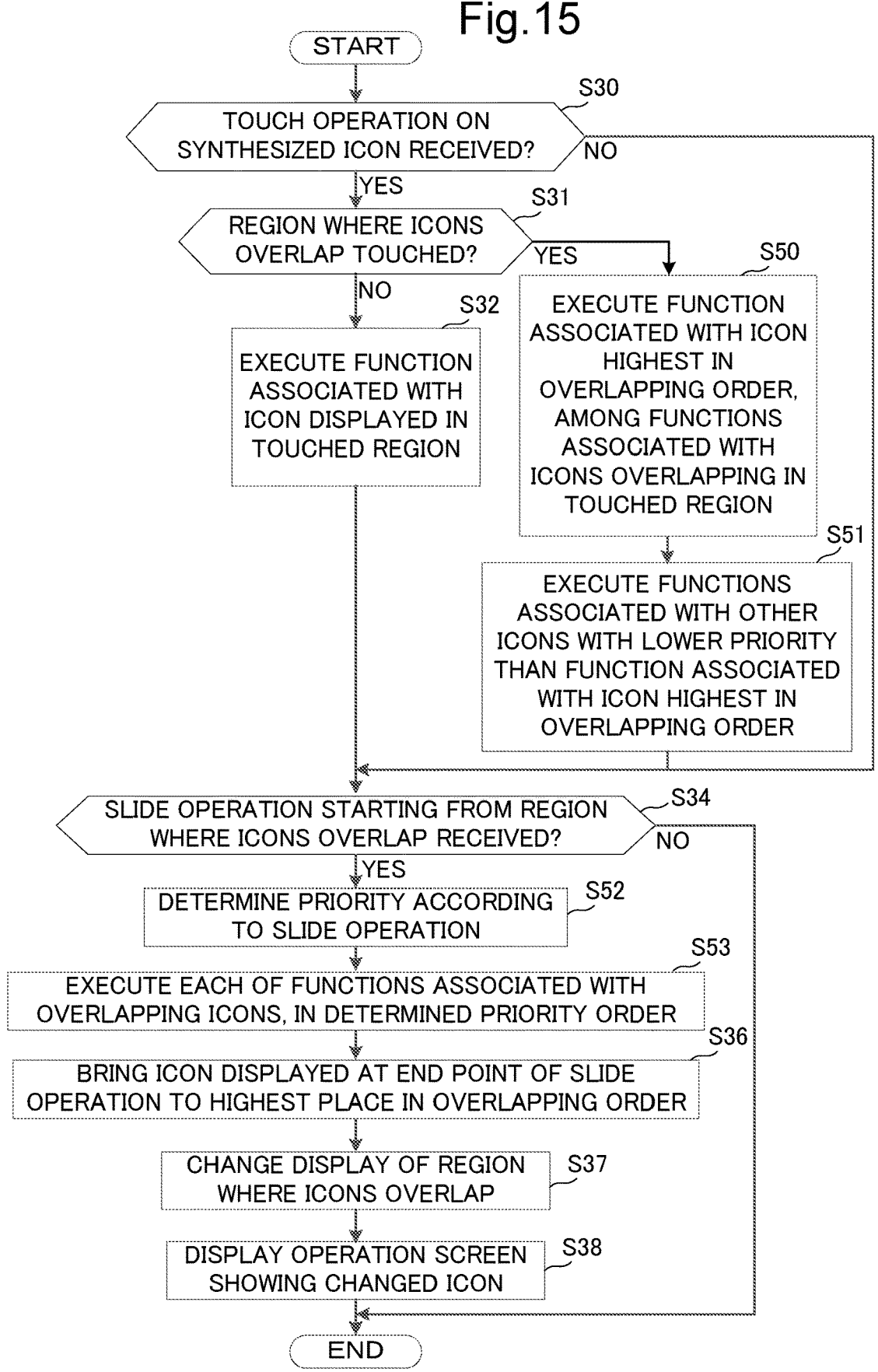
FIG. 15 is a flowchart showing an instruction reception process with respect to the synthesized icon, performed by a display device according to an embodiment 3.

FIG. 15 is a flowchart showing an instruction reception process with respect to the synthesized icon, performed by the display device 1 according to the embodiment 3. The same processes as those of the flowchart shown in FIG. 11 are given the same numeral, and the description thereof may be omitted or simplified.

When the reception unit 102 receives the touch operation performed on the synthesized icon (YES at step S30), and the icons in the touched region are not overlapping (NO at step S31), the controller 101 executes the function associated with the icon displayed in the touched region (step S32).

In contrast, when the icons are overlapping in the touched region (YES at step S31), the controller 101 executes the function associated with the icon in the highest place in the overlapping order, out of the functions respectively associated with the icons overlapping in the touched region (step S50). The controller 101 then executes the remaining functions associated with the icons with lower priority, than the function associated with the icon in the highest place in the overlapping order (step S51).

When the reception unit 102 receives the touch operation performed on the third region S3 as illustrated in FIG. 8A, the controller 101 first executes the mail function associated with the icon A1, which is highest in the overlapping order, out of the functions associated with the icon A1 and the icon A2 overlapping in the third region S3, namely the mail function and the browser function. Then the controller 101 executes the browser function associated with the icon A2, with lower priority than the mail function.

Figure 16A:
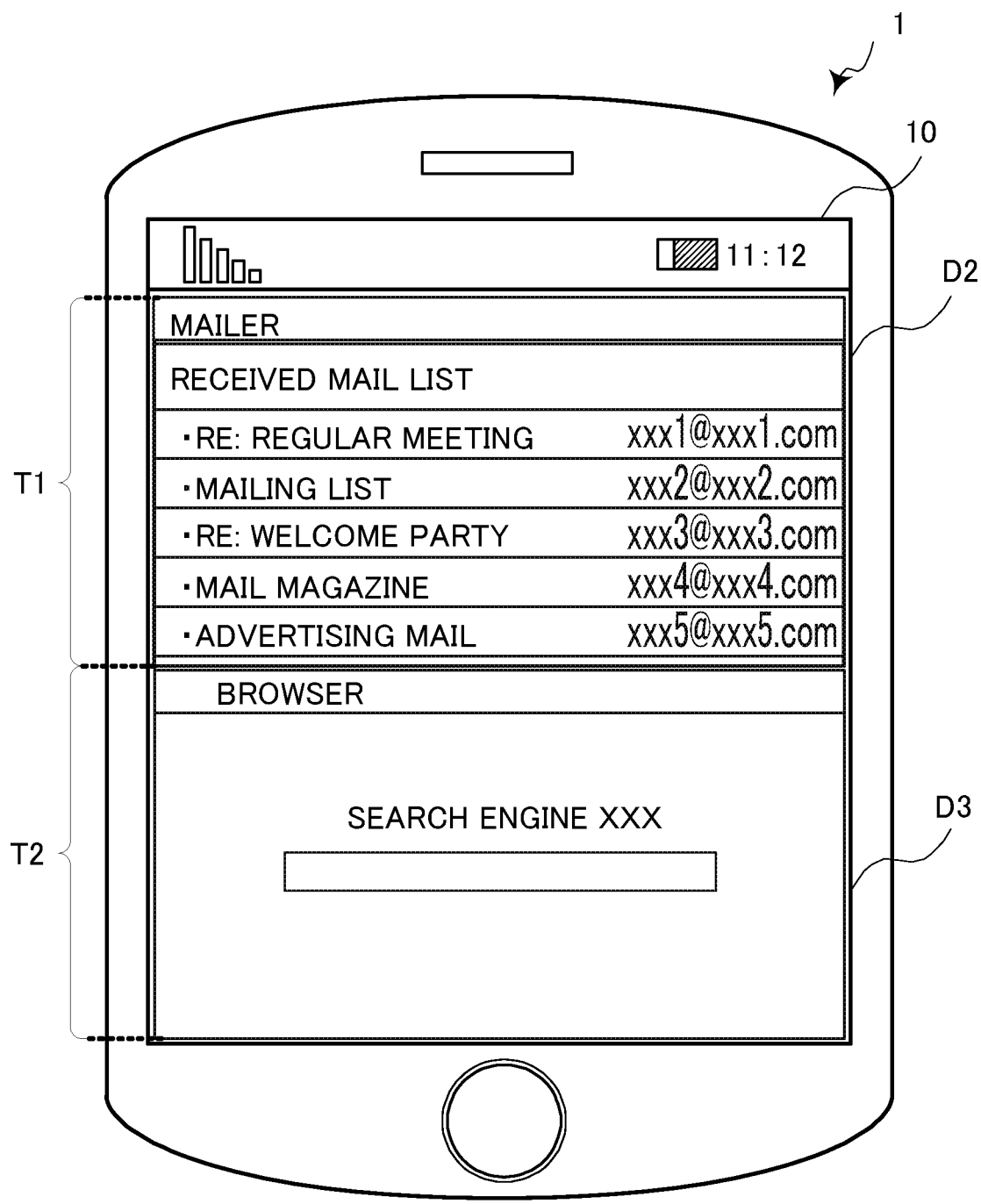
FIGS. 16A and 16B are views each showing an example of an execution screen, displayed on a display unit when a mail function and a browser function are executed.
Figure 16B:
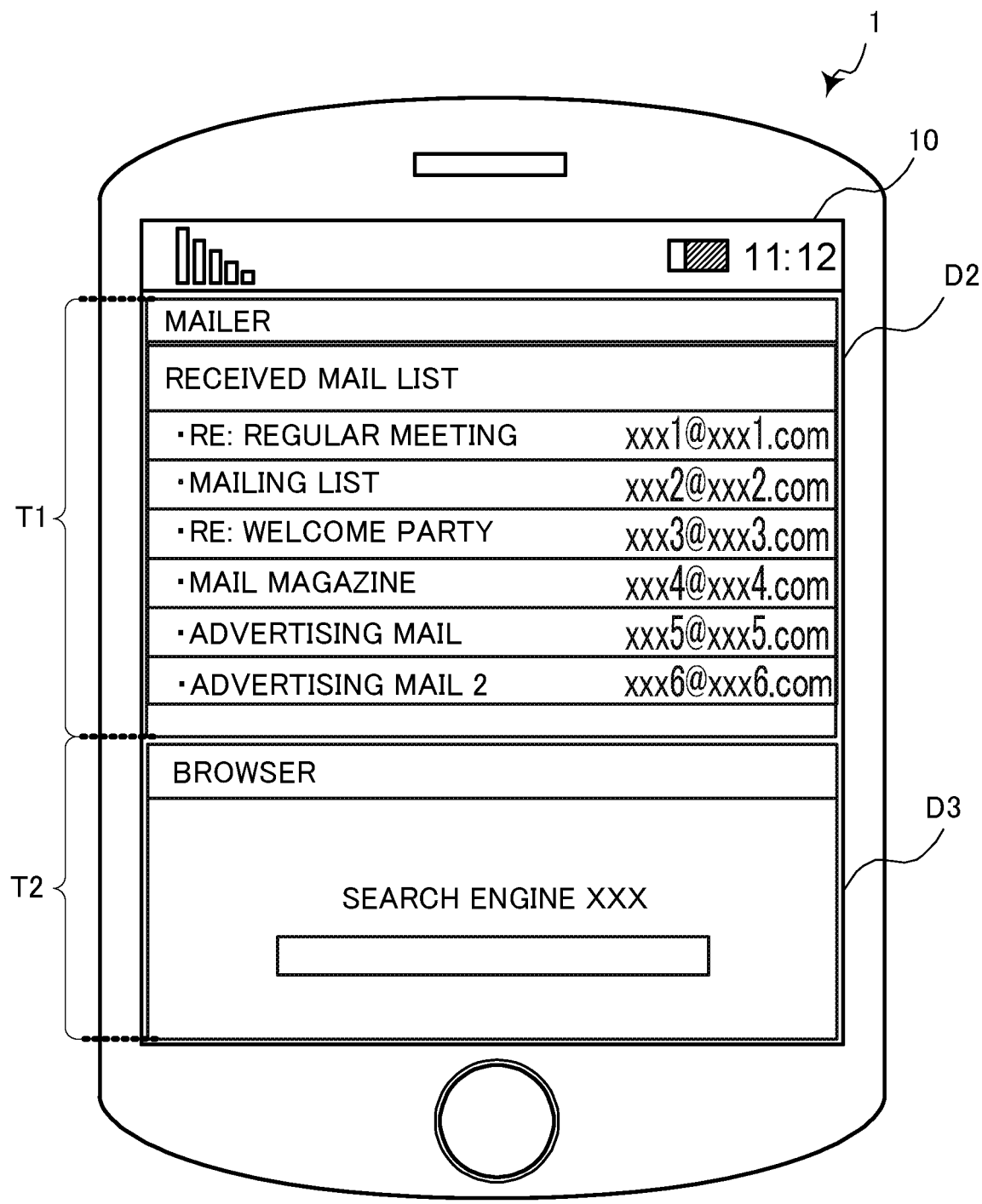

The controller 101 makes the size of the screen (window), displayed on the display unit 10 when the function of the lower priority is executed, smaller than the size of the screen displayed on the display unit 10 when the function of the higher priority is executed. In the example shown in FIG. 16A, an execution screen D2 displayed on the display unit 10 when the mail function is executed, and an execution screen D3 displayed on the display unit 10 when the browser function is executed, are of the same size (size T1=size T2). When the browser function is to be executed with lower priority than the mail function, the controller 101 makes, as shown in FIG. 16B, the size of the execution screen D3, displayed on the display unit 10 when the browser function is executed, smaller than the execution screen D2 displayed on the display unit 10 when the mail function is executed (size T2<size T1).

Alternatively, the controller 101 may execute the function of the higher priority on the foreground, and execute the function of the lower priority on the background.

Further, the controller 101 may allocate a larger resource of the CPU to execute the function of the higher priority, and a smaller resource of the CPU to the function of the lower priority.

Referring back to FIG. 15, when the reception unit 102 receives the slide operation starting from a point in the region where the icons are overlapping in the synthesized icon (YES at step S34), the display control unit 103 determines the priority, on the basis of the slide operation received by the reception unit 102 at step S34 (step S52). More specifically, the display control unit 103 raises the priority of the function associated with the icon displayed at the end point of the slide operation, to a higher place than the functions associated with other icons overlapping at the start point of the slide operation.

Then the controller 101 executes each of the functions associated with the icons overlapping at the start point of the slide operation, according to the priority order determined at step S52 (step S53). When the reception unit 102 receives the slide operation illustrated in FIG. 8B, the controller 101 executes the browser function associated with the icon A2 displayed at the end point of the slide operation, with higher priority than the mail function, out of the functions associated with the icon A1 and the icon A2 overlapping in the third region S3, namely the mail function and the browser function, with lower priority than the mail function.

After step S53, as in the embodiment 1 and the embodiment 2, the display control unit 103 brings the icon displayed at the end point of the slide operation to the highest place in the overlapping order (step S36), and changes the display of the region where the icons are overlapping, according to the changed overlapping order (step S37). After step S37, the display control unit 103 causes the display unit 10 to display the operation screen including the changed icons (step S38).

As described above, in the display device 1 according to the embodiment 3, the slide operation performed on the third region S3 where the icons are overlapping enables selection of the function to be executed by the display device 1 with higher priority, out of the plurality of functions respectively associated with the icons overlapping in the third region S3.

At step S52, the controller 101 may determine the priority according to the sliding speed of the slide operation. The controller 101 may set, when the sliding speed of the slide operation received by the reception unit 102 is high, the priority of the corresponding function to a higher place, than when the sliding speed is low. Thus, the user can not only select the function to be executed by the display device 1 with priority, but also select the extent of priority to be given to the function, by changing the way to perform the slide operation.

Embodiment 4

The foregoing embodiments represent the case where the display control unit 103 enlarges the icon, when the reception unit 102 receives the pinch-out operation performed on the icon. However, in the display device according to an embodiment 4, the display control unit 103 changes the size of the icon according to an inclination of a display panel of the display unit.

Figure 17:
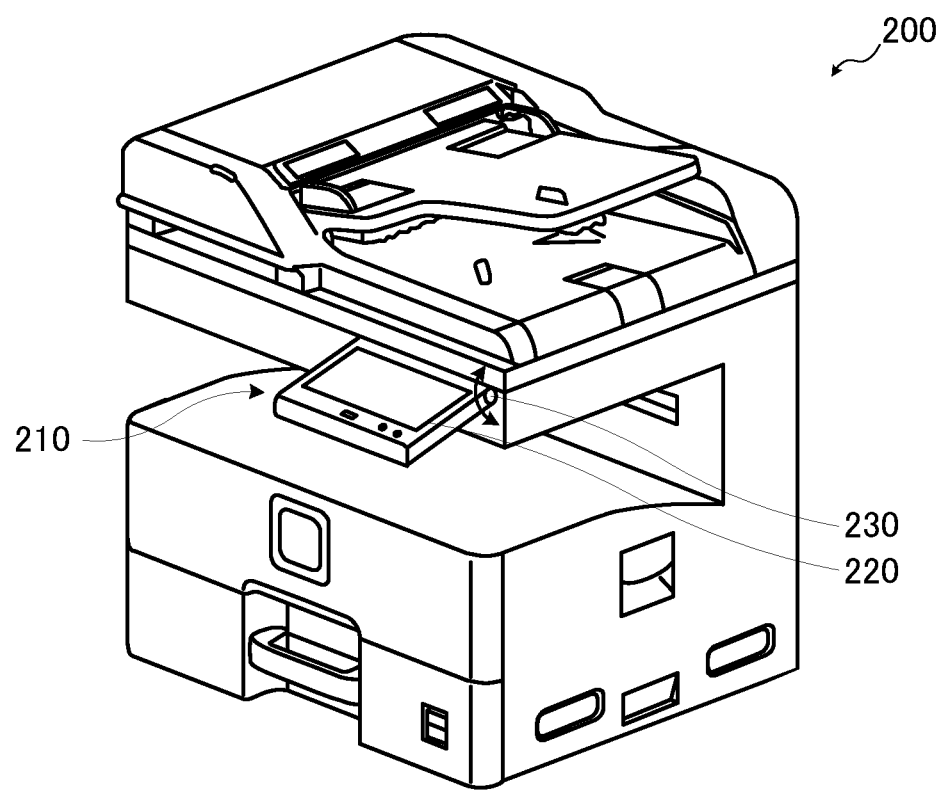
FIG. 17 is a perspective view showing a display device according to an embodiment 4.

FIG. 17 is a perspective view showing a display device according to the embodiment 4. A display device 210 according to the embodiment 4 is mounted on an image forming apparatus 200, which is a multifunction peripheral having a plurality of functions such as facsimile communication, copying, printing, and scanning, so as to pivot about a pivotal shaft 230 in directions indicated by an arrow in FIG. 17. With the pivotal movement of the display device 210, the inclination of a display panel 220 with respect to the horizontal direction is changed.

Figure 18:
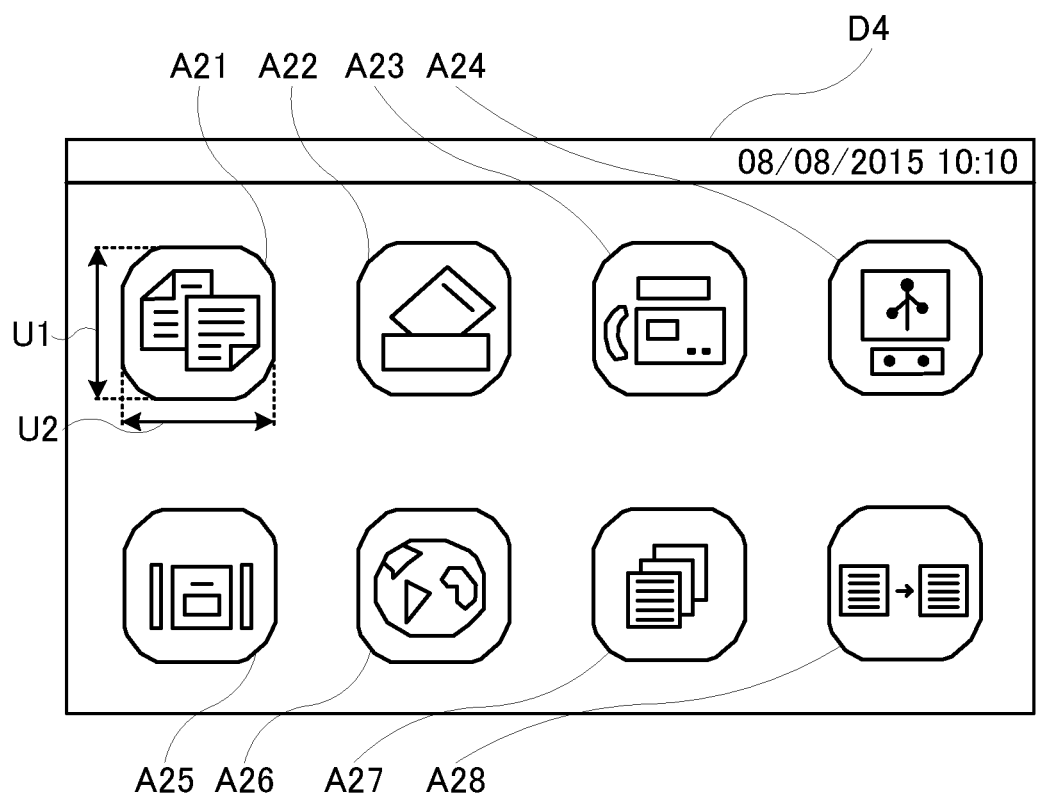
FIG. 18 is a view showing an example of an operation screen displayed on a display panel.

FIG. 18 is a view showing an example of an operation screen displayed on the display panel 220. A plurality of icons A21 to A28 are arranged on an operation screen D4. The icons A21 to A28 are each formed in a generally square shape, such that a vertical length U1 and a horizontal length U2 are the same.

Figure 19A:
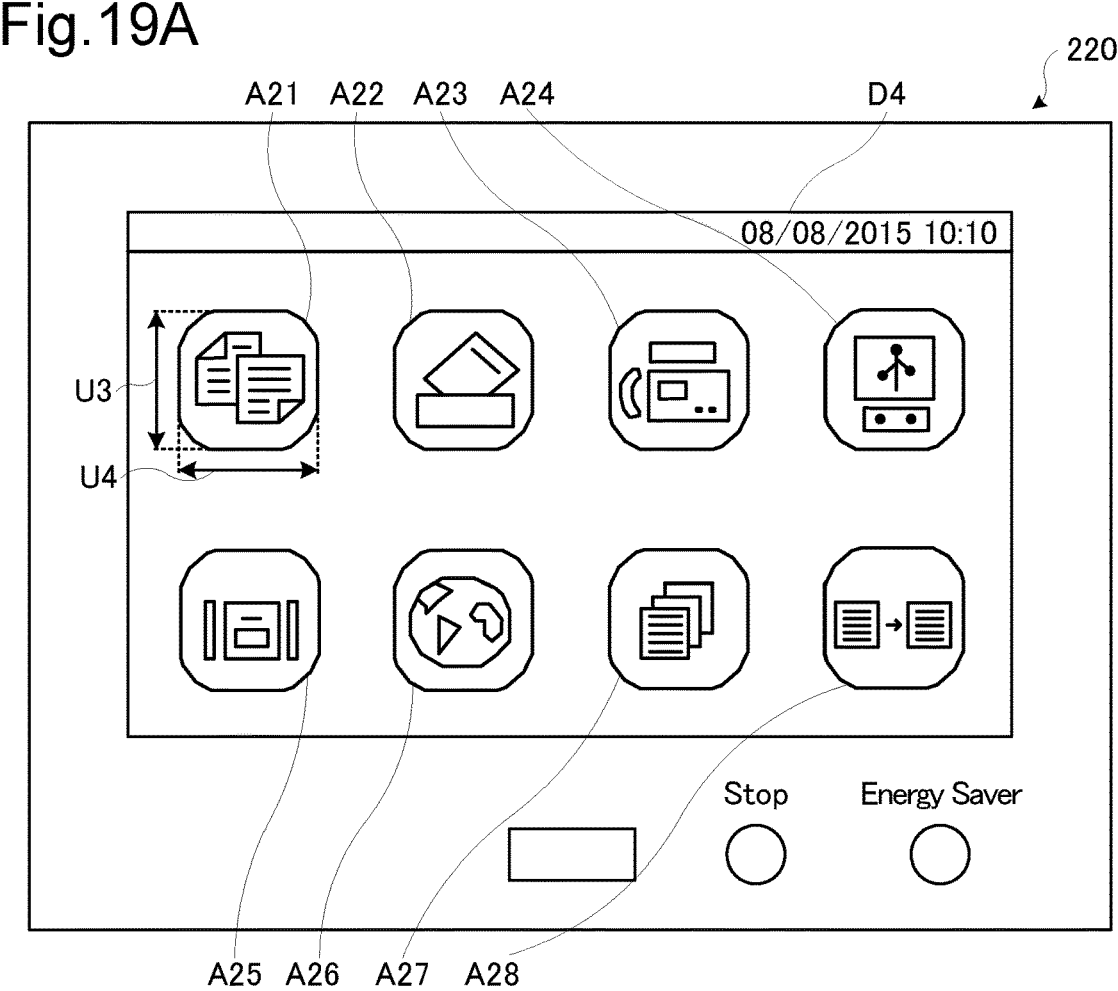
FIG. 19A is a view showing how the user visually recognizes the operation screen in a straight forward view of the display panel.

FIG. 19A is a view showing how the user visually recognizes the operation screen D4, in a straight forward view of the display panel 220. As illustrated in FIG. 19A, the icons A21 to A28 each present a generally square apparent shape, in other words are maintaining the original generally square shape. For example, the icon A21 has an apparent vertical length of U3 and an apparent horizontal length of U4, the vertical length U3 and the horizontal length U4 being the same (U3=U4).

Figure 19B:
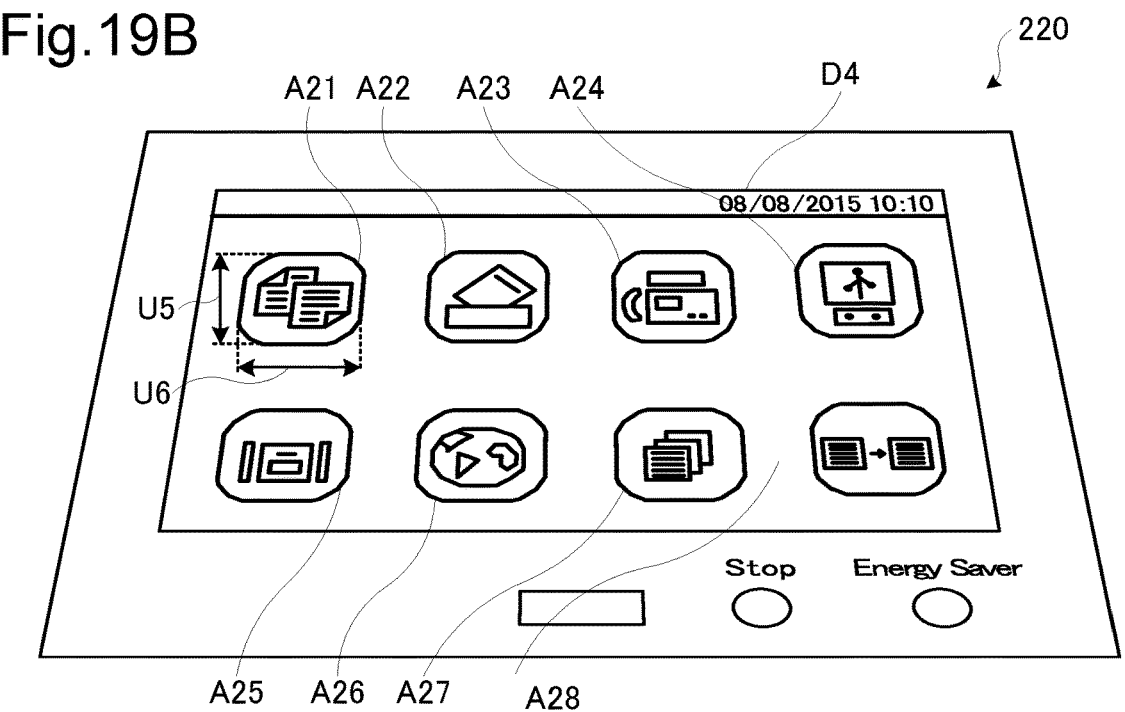
FIG. 19B is a view showing how the user visually recognizes the operation screen in an oblique view of the display panel.

In contrast, when the inclination of the display panel 220 is changed and the user views the display panel 220 in an oblique direction, the user visually recognizes the operation screen D4 of a shape illustrated in FIG. 19B. The display panel 220 is inclined upward in FIG. 17, and therefore the user visually recognizes each of the icons A21 to A28, as if they had contracted upward in the drawing, as illustrated in FIG. 19B. Accordingly, the icons A21 to A28 each assume a generally rectangular shape, having an apparent shape in which the vertical length is shorter than the horizontal length. Thus, the apparent shape of each of the icons A21 to A28 collapses from the original shape, which is generally square. For example, the apparent vertical length of the icon A21 becomes U5 and the apparent horizontal length thereof becomes U6, the vertical length U5 being shorter than the horizontal length U6 (U5<U6). Since the apparent shape of each of the icons A21 to A28 thus collapses from the original shape which is generally square, the visual recognizability of the icons A21 to A28 is degraded.

To minimize the mentioned drawback, the display control unit 103 causes the display device 210 to display each of the icons A21 to A28 in a form expanded in a first direction (upward in the drawing). The first direction refers to a direction away from the user's eye on the operation screen, defined when the inclination of the display panel 220 is changed to a given direction.

Here, the display control unit 103 is configured to perform two display modes for displaying the icons A21 to A28, namely a normal display mode and a corrected display mode. The normal display mode refers to a mode of causing the display device 210 to display the icons A21 to A28 arranged on the operation screen D4 in the original form. The original form refers to the images stored in the storage unit as the icons A21 to A28, displayed as they are by the display device 210. In this embodiment, the icons A21 to A28 of the generally square shape, the vertical length and the horizontal length of which are the same, are stored in the storage unit.

The corrected display mode refers to a mode of causing the display device 210 to display the icons A21 to A28 stored in the storage unit, but expanded upward in the drawing. In which of the display modes the display control unit 103 causes the display device 210 to display the icons is selectively determined, depending on the user operation inputted through a predetermined reception screen displayed on the display device 210. Here, the transition of the display mode, from the normal display mode to the corrected display mode, may be performed, when the inclination detection unit 40 detects a change of the inclination of the display panel 220.

When the display control unit 103 controls the display operation in the normal display mode, the operation screen D4 as illustrated in FIG. 18 is displayed on the display panel 220. When the user views the operation screen D4 in an oblique direction, the user visually recognizes the operation screen D4 as illustrated in FIG. 19B.

Figure 20:
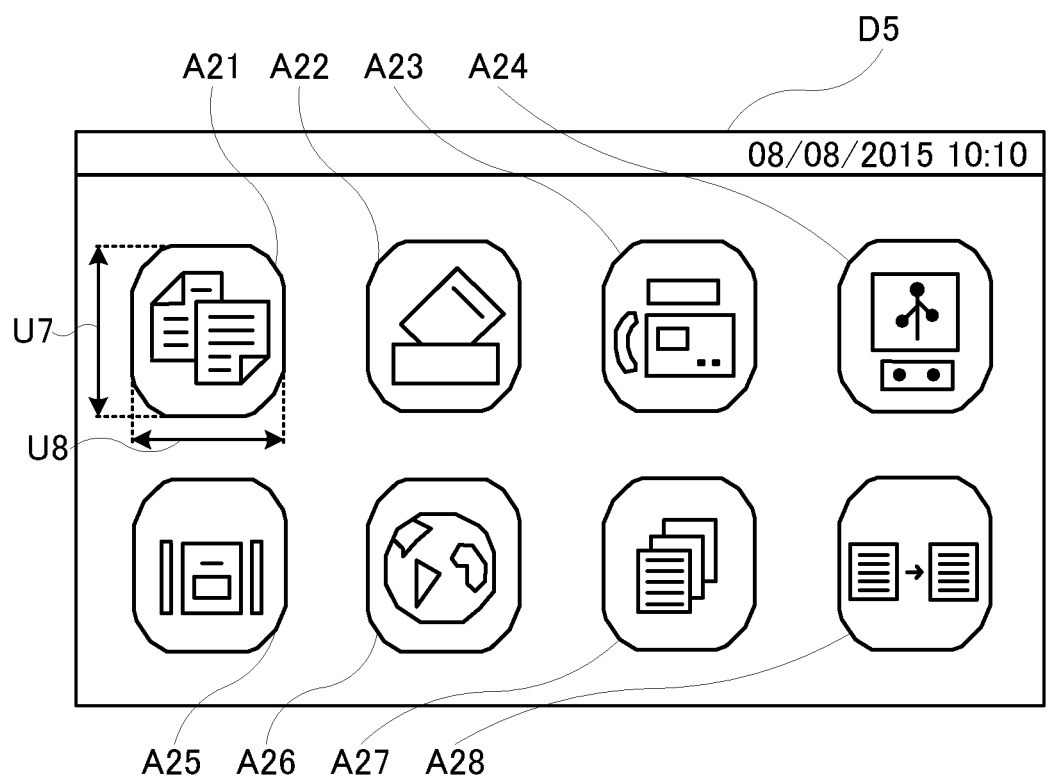
FIG. 20 is a view showing an operation screen displayed on the display panel in a corrected display mode.

In contrast, when the display control unit 103 controls the display operation in the corrected display mode, an operation screen D5 as illustrated in FIG. 20 is displayed on the display panel 220. On the operation screen D5 displayed on the display panel 220, the icons A21 to A28, each expanded upward in the drawing, are arranged. As result of expanding the generally square icons upward in the drawing, the icons A21 to A28 are turned into a generally rectangular, having the vertical length longer than the horizontal length. For example, the vertical length of the icon A21 becomes U7 (U7>U1), and the horizontal length thereof becomes U8 (U8=U2). Thus, the vertical length U7 is longer than the horizontal length U8 (U7>U8).

Figure 21:
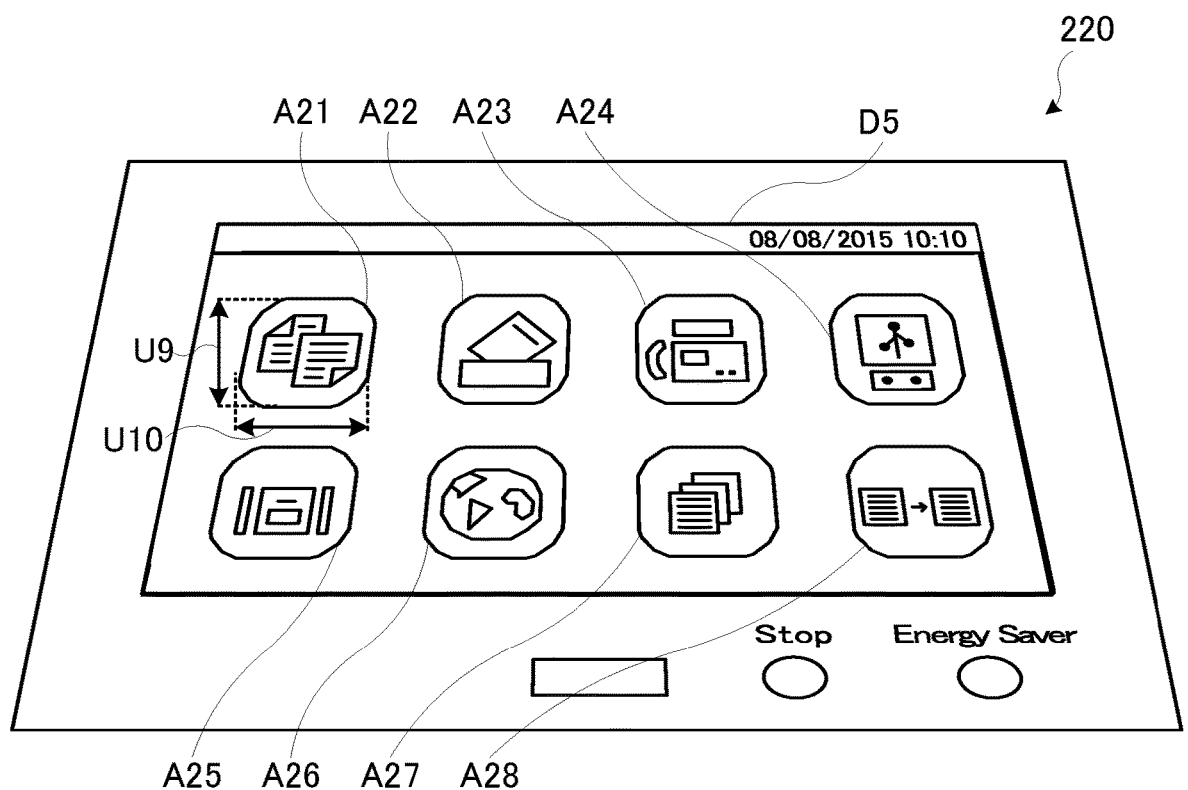
FIG. 21 is a view showing how the user visually recognizes the operation screen shown in FIG. 20, in an oblique view thereof.

In an oblique view of the operation screen D5 changed as above, the operation screen D5 as illustrated in FIG. 21 is visually recognized by the user. Since the display panel 220 is inclined upward in FIG. 17, the icons A21 to A28 are each visually recognized by the user as if they had contracted upward in the drawing. Therefore, the apparent vertical length of the icons A21 to A28 appears to be shorter. For example, the apparent vertical length of the icon A21 becomes U9, and the apparent horizontal length thereof becomes U10.

Upon comparison between the ratio of the apparent vertical length U5 to the horizontal length U6 (aspect ratio) of the icon A21 before the expansion, and the ratio of the apparent vertical length U9 to the horizontal length U10 (aspect ratio) of the icon A21 after the expansion, on the premise that the operation screen is viewed in the same angle in the cases shown in FIG. 19B and FIG. 21, the apparent aspect ratio of the icon A21 after the expansion is closer to "1". In other words, the apparent shape of the icon A21 after the expansion is closer to the generally square shape, than the apparent shape of the icon A21 before the expansion.

Thus, the apparent shape of each of the icons A21 to A28 after the expansion is, though not generally square, closer to the original shape which is generally square, than the apparent shape of the icon A21 before the expansion.

Therefore, even when the user has to view the operation screen displayed on the display panel 220 in an oblique direction, because of a change of the inclination of the display panel 220, the degradation in visual recognizability of the icons arranged on the operation screen can be prevented.

Figure 22:
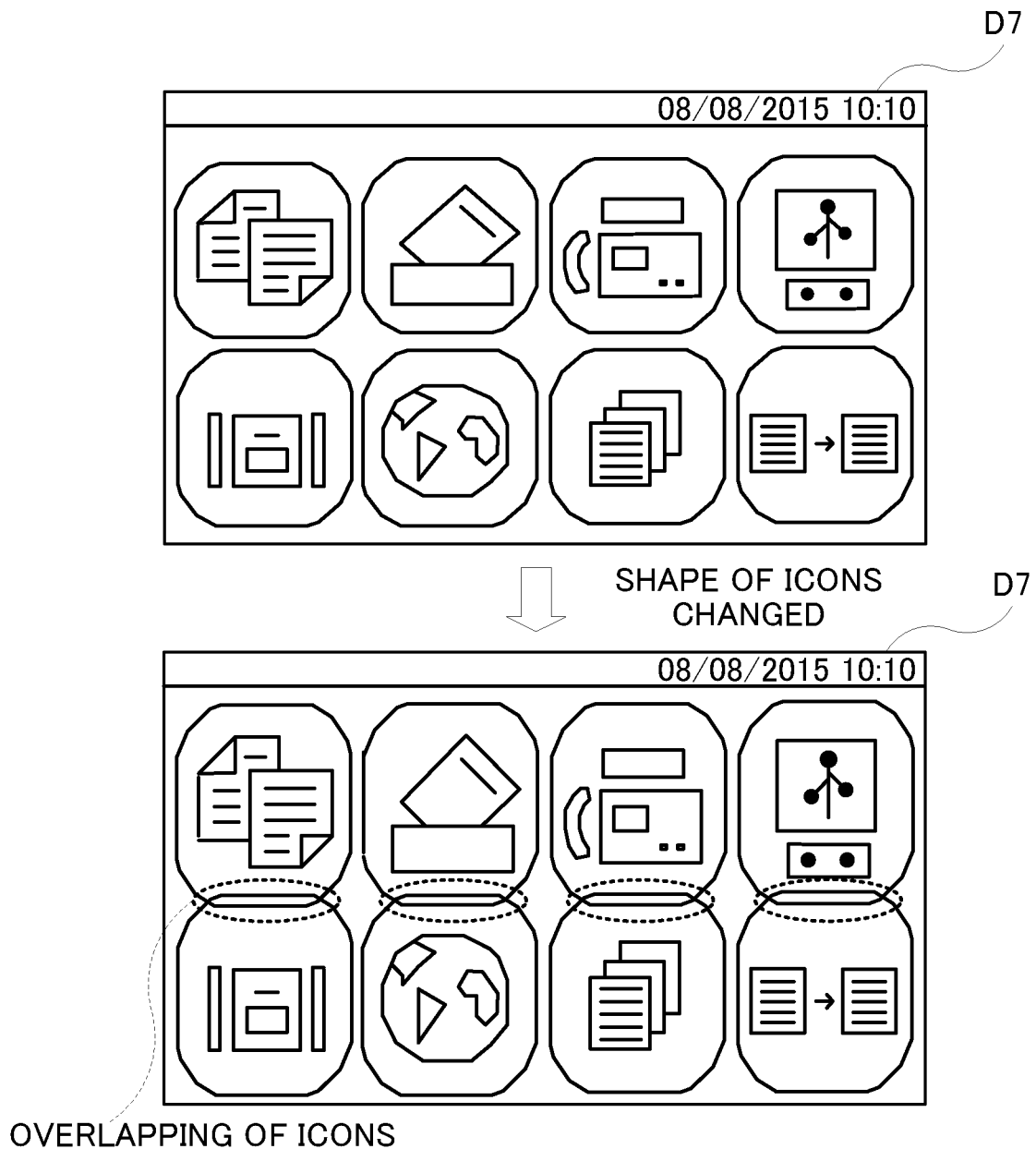
FIG. 22 includes views showing how the icons overlap, depending on the inclination of the display panel.

When the display control unit 103 expands the icons A21 to A28 as in the display device 210 according to the embodiment 4, the icons located adjacent to each other may overlap. In the example shown in FIG. 22, the clearance between the icons arranged on the operation screen D7 is narrow, and therefore the icons overlap as result of the expansion of the icons in the upper direction in the drawing, performed by the display control unit 103. In this case, the display control unit 103 generates a synthesized icon by superposing the icons on each other, as in the embodiment 1 to the embodiment 3. Therefore, when the allocated areas of the respective icons overlap owing to the inclination of the display panel 220, the user's operation can be received through the synthesized icon generated. In addition, the slide operation performed on the region where the icons are overlapping enables selection of the function to be executed by the display device 210, out of the plurality of functions associated with the icons overlapping in the region.

Embodiment 5

In a display device according to an embodiment 5, the display control unit 103 expands the icons not only in the first direction, but also in a second direction orthogonal to the first direction. In addition, the display control unit 103 increases the expansion length in the second direction, toward a farther side in the first direction.

Figure 23:
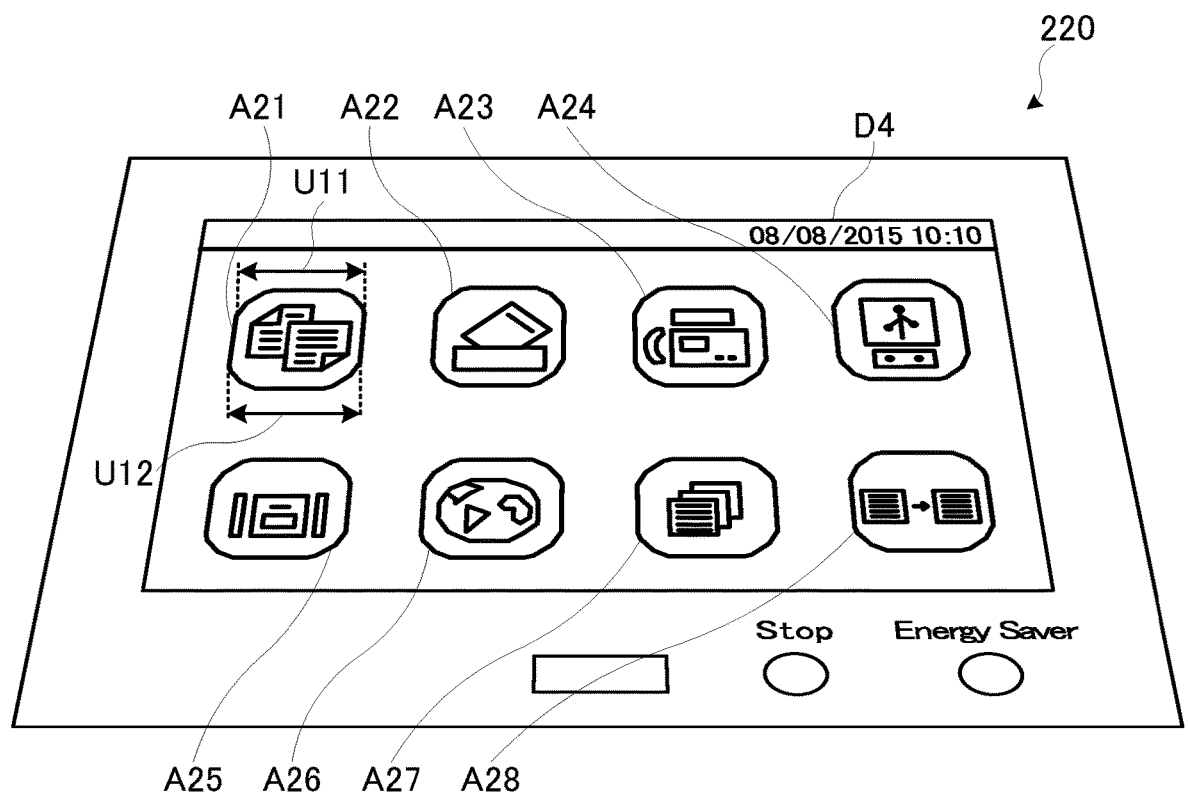
FIG. 23 is a view showing the operation screen in which the icons are expanded, viewed in an oblique direction.

FIG. 23 is a view showing the operation screen in which the icons are expanded, in the display device according to the embodiment 4, viewed in an oblique direction. With an increase of the distance between the user's eye and the display panel 220, the icons displayed on the operation screen appear to be smaller, to the user's eye.

Now, an apparent length U11 of the upper side of the icon A21 is shorter than an apparent length U12 of the lower side thereof. This is because the distance between the upper side of the icon A21 and the user's eye is longer than the distance between the lower side of the icon A21 and the user's eye. Accordingly, the icon A21 apparently assumes a trapezoidal shape. Likewise, the remaining icons A22 to A28 also apparently assume a trapezoidal shape. The icons A21 to A28 arranged on the operation screen D4 thus assume a different shape from the original shape which is generally square, and therefore the visual recognizability of the icons A21 to A28 is degraded.

Figure 24:
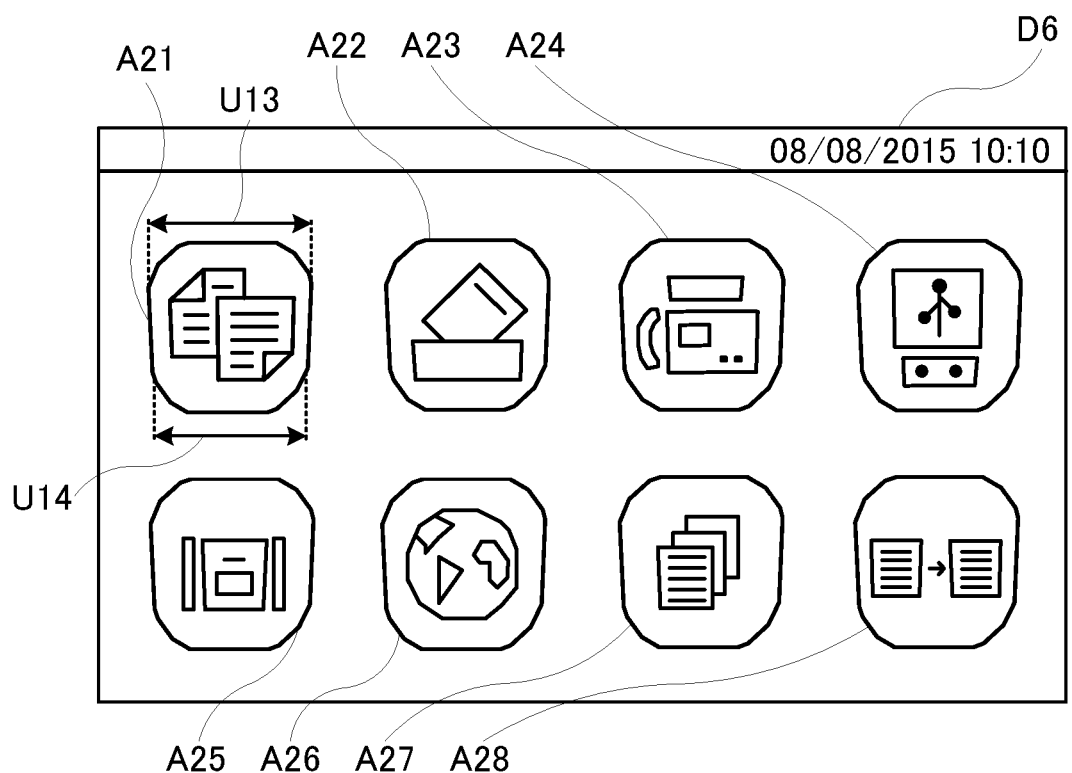
FIG. 24 is a view showing an example of an operation screen displayed on a display panel, in a display device according to an embodiment 5.

To minimize the mentioned drawback, in the display device according to the embodiment 5, the display control unit 103 is configured to expand each of the icons A21 to A28, not only in the first direction, but also in a second direction orthogonal to the first direction first direction (upward in the drawing), but also in the second direction orthogonal to the first direction (left-right direction in the drawing). In addition, the display control unit 103 increases the expansion length of the icon in the second direction, toward a farther side (toward the upper side in the drawing) in the first direction. FIG. 24 is a view showing an example of the operation screen displayed by the display control unit 103 on the display panel 220. In the example shown in FIG. 24, the icons A21 to A28, expanded upward in the drawing, and then also expanded in the left-right direction in the drawing, are arranged on an operation screen D6.

As result of the expansion of each of the icons of the generally rectangular shape, having the vertical length longer than the horizontal length, in the left-right direction in the drawing, the icons A21 to A28 each assume an inverted trapezoidal shape, having the upper side longer than the lower side. For example, the length of the upper side of the icon A21 is U13, and the length of the lower side thereof is U14, the length U13 of the upper side being longer than the length U14 of the lower side (U13>U14).

As result of expanding the icons as above, the apparent shape of the icons displayed on the operation screen can be visually recognized as the shape close to the original shape of the icons, which is generally square, even when the user views the operation screen in an oblique direction.

When the icons located adjacent to each other overlap, as result of the expansion of the icons A21 to A28 in the first and second directions performed by the display control unit 103, as in the display device according to the embodiment 5, the display control unit 103 generates a synthesized icon by superposing the icons on each other, as in the embodiment 1 to the embodiment 3.

It is to be noted that the present invention is not limited to the foregoing embodiments, but may be modified in various manners.

For example, the display device according to the foregoing embodiments are applicable, not only to the mobile terminals such as a smartphone and the image forming apparatuses, but also to display devices incorporated in personal computers (PC) and TV sets.

Further, although the foregoing embodiments represent the case where the icons displayed on the operation screen are generally square, the present invention is not limited to such a configuration. The shape of the icons displayed on the operation screen is not specifically limited, and may be, for example, generally circular.

The display control program referred to in the foregoing embodiments may be recorded on a non-transitory computer-readable recording medium, such as a hard disk, a CD-ROM, a DVD-ROM, or a semiconductor memory. In this case, the non-transitory computer-readable recording medium, having the control program recorded thereon, constitutes another embodiment of the present invention.

Further, the foregoing embodiments and the variations thereof may be combined as desired.

What is claimed is:

1. A display device comprising:
    a display unit including a display that displays an operation screen in which a plurality of icons, each associated with a predetermined function and representing an image indicating the function associated with the icon, are arranged; and
    a control unit that includes a CPU and, when the CPU executes a display control program, acts as:
        a display control unit that controls a displaying operation of the display unit;
        a reception unit that receives an operation inputted through the operation screen; and
        a processing unit that executes the operation received by the reception unit,
    wherein, the display control unit is configured to (i) enlarge the icon when the reception unit receives a predetermined operation with respect to the icon, (ii) generate, when respective allocated areas of at least two icons overlap owing to the enlarging of the icon, a synthesized icon including a first region where the allocated areas are not overlapping and a second region where the allocated areas overlap, and representing, in the second region, a synthesized image generated according to a plurality of images represented by the at least two icons, and (iii) cause the display unit to display the synthesized icon generated, the processing unit is configured to (i) execute the function associated with the icon shown in the first region, when the reception unit receives an operation of selecting a point in the first region of the synthesized icon, and (ii) execute, when the reception unit receives a slide operation starting from a point in the second region of the synthesized icon, the function associated with the icon displayed at an end point of the slide operation, out of the functions respectively associated with the at least two icons, the display control unit generates the synthesized image, by converting the image represented by one of the at least two icons into a semi-transparent image, so that the images represented by remaining icons are visually recognized through the semi-transparent image, and when the reception unit receives an operation of selecting a point in the second region of the synthesized icon, the processing unit executes the function associated with the icon representing the semi-transparent image, out of the functions respectively associated with the at least two icons.

2. The display device according to claim 1, wherein, when respective allocated areas of at least two icons overlap owing to the enlarging of the icon, the display control unit generates the synthesized image, by converting the image represented by one of the at least two icons into the semi-transparent image.

3. The display device according to claim 1, further comprising a storage device containing a plurality of staged values each indicating a clearance between the icons that allows location of the icons adjacent to each other, wherein the display control unit (i) selects, when the clearance between an enlarged icon and another icon adjacent thereto is changed, one of the plurality of staged values stored in the storage device, according to the clearance that has been changed, (ii) determines the allocated area of the enlarged icon, such that the clearance between the enlarged icon and the icon adjacent thereto accords with the selected value, and (iii) generates the synthesized icon when the allocated areas of the enlarged icon and the icon adjacent thereto overlap as result of the determining of the allocated area.

4. The display device according to claim 3, wherein the display control unit selects a value closest to the changed clearance between the icons, out of the plurality of staged values stored in the storage device.

5. The display device according to claim 4, wherein the predetermined operation to be received by the reception unit includes a pinch-out operation performed on the icon.

6. A display device comprising:

a display unit including a display that displays an operation screen in which a plurality of icons, each associated with a predetermined function and representing an image indicating the function associated with the icon, are arranged; and a control unit that includes a CPU and, when the CPU executes a display control program, acts as:

a display control unit that controls a displaying operation of the display unit;

a reception unit that receives an operation inputted through the operation screen; and a processing unit that executes the operation received by the reception unit, wherein, the display control unit is configured to (i) enlarge the icon when the reception unit receives a predetermined operation with respect to the icon, (ii) generate, when respective allocated areas of at least two icons overlap owing to the enlarging of the icon, a synthesized icon including a first region where the allocated areas are not overlapping and a second region where the allocated areas overlap, and representing, in the second region, a synthesized image generated according to a plurality of images represented by the at least two icons, and (iii) cause the display unit to display the synthesized icon generated, the processing unit is configured to (i) execute the function associated with the icon shown in the first region, when the reception unit receives an operation of selecting a point in the first region of the synthesized icon, and (ii) execute, when the reception unit receives a slide operation starting from a point in the second region of the synthesized icon, the function associated with the icon displayed at an end point of the slide operation, out of the functions respectively associated with the at least two icons, the display control unit generates the synthesized image, by converting the image represented by one of the at least two icons into a semi-transparent image, so that the images represented by remaining icons are visually recognized through the semi-transparent image, and when the reception unit receives a slide operation starting from a point in the second region of the synthesized icon, the display control unit updates the synthesized image, by converting the image represented by the icon displayed at the end point of the slide operation, out of the at least two icons, into the semi-transparent image, so that images represented by other icons are visually recognize through the semi-transparent image, and causes the display unit to display the synthesized icon in which the updated synthesized image is located in the second region.

7. A display device comprising:

a display unit including a display that displays an operation screen in which a plurality of icons, each associated with a predetermined function and representing an image indicating the function associated with the icon, are arranged; and a control unit that includes a CPU and, when the CPU executes a display control program, acts as:

a display control unit that controls a displaying operation of the display unit;

a reception unit that receives an operation inputted through the operation screen; and a processing unit that executes the operation received by the reception unit, wherein, the display control unit is configured to (i) enlarge the icon when the reception unit receives a predetermined operation with respect to the icon, (ii) generate, when respective allocated areas of at least two icons overlap owing to the enlarging of the icon, a synthesized icon including a first region where the allocated areas are not overlapping and a second region where the allocated areas overlap, and representing, in the second region, a synthesized image generated according to a plurality of images represented by the at least two icons, and (iii) cause the display unit to display the synthesized icon generated, the processing unit is configured to (i) execute the function associated with the icon shown in the first region, when the reception unit receives an operation of selecting a point in the first region of the synthesized icon, and (ii) execute, when the reception unit receives a slide operation starting from a point in the second region of the synthesized icon, the function associated with the icon displayed at an end point of the slide operation, out of the functions respectively associated with the at least two icons, and when the reception unit receives the slide operation starting from a point in the second region of the synthesized icon, the processing unit executes the function associated with a first icon displayed at the end point of the slide operation, out of the functions respectively associated with the at least two icons, and further executes a function associated with a second icon other than the first icon, with lower priority than the function associated with the first icon.

8. The display device according to claim 7, wherein the display control unit generates the synthesized image, by converting the image represented by one of the at least two icons into a semi-transparent image, so that the images represented by remaining icons are visually recognized through the semi-transparent image, and the processing unit executes, when the reception unit receives an operation of selecting a point in the second region of the synthesized icon, the function associated with the icon representing the semi-transparent image, out of the functions respectively associated with the at least two icons, and executes the functions associated with other icons with lower priority than the function associated with the icon representing the semi-transparent image.

9. The display device according to claim 7, wherein the execution of the function with lower priority by the processing unit includes making a size of a window, displayed on the display unit when the function associated with the second icon is executed, smaller than a size of a window displayed on the display unit when the function associated with the first icon is executed.

10. The display device according to claim 7, wherein the execution of the function with lower priority by the processing unit includes executing the function associated with the first icon on a foreground, and executing the function associated with the second icon on a background.

11. A display device comprising:

a display unit including a display that displays an operation screen in which a plurality of icons, each associated with a predetermined function and representing an image indicating the function associated with the icon, are arranged; and a control unit that includes a CPU and, when the CPU executes a display control program, acts as:

a display control unit that controls a displaying operation of the display unit;

a reception unit that receives an operation inputted through the operation screen; and a processing unit that executes the operation received by the reception unit, wherein, the display control unit is configured to (i) enlarge the icon when the reception unit receives a predetermined operation with respect to the icon, (ii) generate, when respective allocated areas of at least two icons overlap owing to the enlarging of the icon, a synthesized icon including a first region where the allocated areas are not overlapping and a second region where the allocated areas overlap, and representing, in the second region, a synthesized image generated according to a plurality of images represented by the at least two icons, and (iii) cause the display unit to display the synthesized icon generated, the processing unit is configured to (i) execute the function associated with the icon shown in the first region, when the reception unit receives an operation of selecting a point in the first region of the synthesized icon, and (ii) execute, when the reception unit receives a slide operation starting from a point in the second region of the synthesized icon, the function associated with the icon displayed at an end point of the slide operation, out of the functions respectively associated with the at least two icons, the display unit includes a display panel an inclination of which is variable, the display control unit enlarges the icon, when the inclination of the display panel is changed, by expanding the icon in a first direction away from an eye of a user on the operation screen, and generates the synthesized icon when the allocated areas of the icons overlap as result of the enlarging of the icon, and the display control unit enlarges the icon by further expanding the icon in a second direction orthogonal to the first direction, such that an expansion length in the second direction increases toward a farther side in the first direction.

* * * * *